(12) United States Patent
Suzuki et al.

(10) Patent No.: US 9,955,402 B2
(45) Date of Patent: Apr. 24, 2018

(54) INFORMATION PROCESSING METHOD, COMMUNICATIONS METHOD, COMMUNICATIONS NODE, SYSTEM, AND COMPUTER PRODUCT

(71) Applicant: Fujitsu Limited, Kawasaki-shi, Kanagawa (JP)

(72) Inventors: Takahisa Suzuki, Yokohama (JP); Koichiro Yamashita, Hachioji (JP); Hiromasa Yamauchi, Usakos (NA); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/745,887

(22) Filed: Jun. 22, 2015

(65) Prior Publication Data

US 2015/0289192 A1    Oct. 8, 2015

Related U.S. Application Data

(63) Continuation of application No. PCT/JP2012/083755, filed on Dec. 26, 2012.

(51) Int. Cl.
*H04W 40/10* (2009.01)
*H04W 4/00* (2018.01)
(Continued)

(52) U.S. Cl.
CPC .......... *H04W 40/10* (2013.01); *H04L 67/10* (2013.01); *H04L 67/12* (2013.01); *H04L 69/40* (2013.01);
(Continued)

(58) Field of Classification Search
None
See application file for complete search history.

(56) References Cited

U.S. PATENT DOCUMENTS 8,760,995 B1 * 6/2014 Gautam ................ H04W 40/10
370/216
2003/0063585 A1 * 4/2003 Younis .................... G01D 9/005
370/331
(Continued)

FOREIGN PATENT DOCUMENTS

CN    1561509 A    1/2005
JP    2003-115092    4/2003
(Continued)

OTHER PUBLICATIONS

Extended European Search Report dated Feb. 26, 2016 in corresponding European Patent Application No. 12890994.2.
(Continued)

*Primary Examiner* — Chi H Pham
*Assistant Examiner* — Vladislav Agureyev
(74) *Attorney, Agent, or Firm* — Staas & Halsey LLP

(57) ABSTRACT

When a first sensor node has a large power consumption, an information processing apparatus propagates a portion of request information for a data process having the request recipient set to a second sensor node, through a path that does not pass through the first sensor node. For example, the information processing apparatus changes a division rate at a third sensor node acting as a branching point for the request information for the data process having the request recipient set to the second sensor node to thereby change the distribution of the transferred data amount and equalize the power consumption of the sensor nodes in a sensor network.

9 Claims, 31 Drawing Sheets

(51) Int. Cl.
  *H04W 24/10* (2009.01)
  *H04W 52/46* (2009.01)
  *H04W 72/04* (2009.01)
  *H04L 29/08* (2006.01)
  *H04L 29/14* (2006.01)

(52) U.S. Cl.
  CPC ........... *H04W 4/005* (2013.01); *H04W 24/10* (2013.01); *H04W 52/46* (2013.01); *H04W 72/0486* (2013.01); *Y02B 60/42* (2013.01); *Y02B 60/50* (2013.01)

(56) References Cited

U.S. PATENT DOCUMENTS

| | | | |
|---|---|---|---|
| 2004/0010492 A1* | 1/2004 | Zhao | H04W 40/04 |
| 2004/0254652 A1 | 12/2004 | Ota et al. | |
| 2005/0111428 A1* | 5/2005 | Orlik | H04L 45/02 370/344 |
| 2006/0092913 A1* | 5/2006 | Joseph | H04L 45/08 370/351 |
| 2008/0075028 A1* | 3/2008 | Park | H04L 45/122 370/311 |
| 2008/0082851 A1* | 4/2008 | Zettler | G06F 1/28 713/340 |
| 2009/0006522 A1* | 1/2009 | Kim | H04L 29/12113 709/201 |
| 2011/0116402 A1* | 5/2011 | Kimura | H04L 45/34 370/252 |
| 2011/0228777 A1* | 9/2011 | Samajpati | H04W 40/10 370/392 |
| 2015/0063183 A1 | 3/2015 | Nishioka | |

FOREIGN PATENT DOCUMENTS

| | | |
|---|---|---|
| JP | 2012-065166 | 3/2012 |
| JP | 2012-129780 | 7/2012 |
| WO | WO 2009/067063 A1 | 5/2009 |
| WO | WO 2012/157187 A1 | 11/2012 |

OTHER PUBLICATIONS

Li et al., "Joint Task Placement, Routing and Power Control for Low Power Mobile Grid Computing in Ad Hoc Network," *Grid and Cooperative Computing—GCC 2004, Lecture Notes in Computer Science*, vol. 3251, Oct. 2004, pp. 591-600.

Yu et al., "Energy-Balanced Task Allocation for Collaborative Processing in Wireless Sensor Networks," *Mobile Networks and Applications*, vol. 10, Nos. 1-2, Feb. 2005, pp. 115-131.

Partial Supplementary European Search Report dated Nov. 9, 2015 in European Patent App. No. 12890994.2.

European Office Action dated May 29, 2017 in corresponding European Patent Application No. 12890994.2.

International Search Report dated Mar. 12, 2013 in corresponding international application PCT/JP2012/083755.

Office Action issued by the State Intellectual Property Office of People's Republic of China dated Nov. 27, 2017 in corresponding Chinese patent application No. 201280077999.9.

* cited by examiner

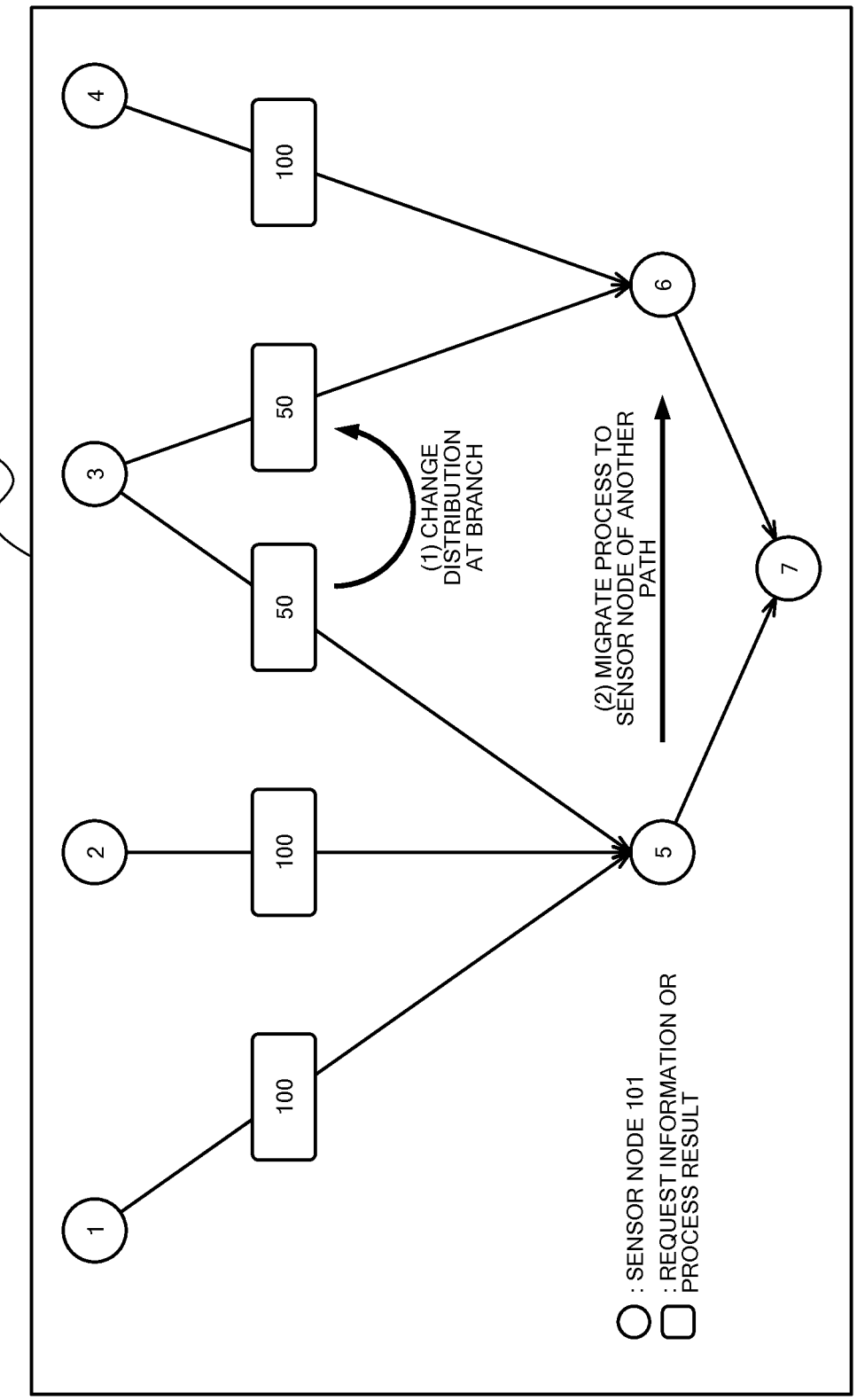

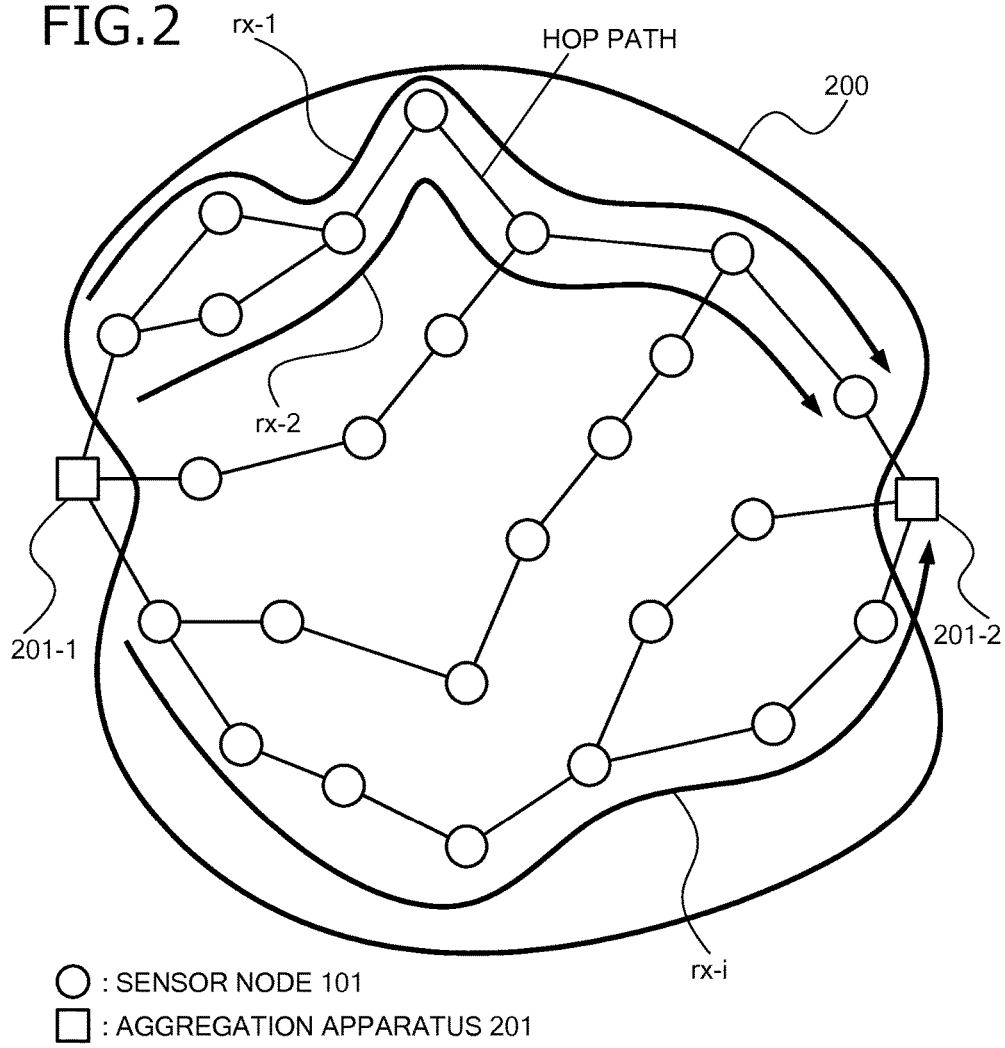

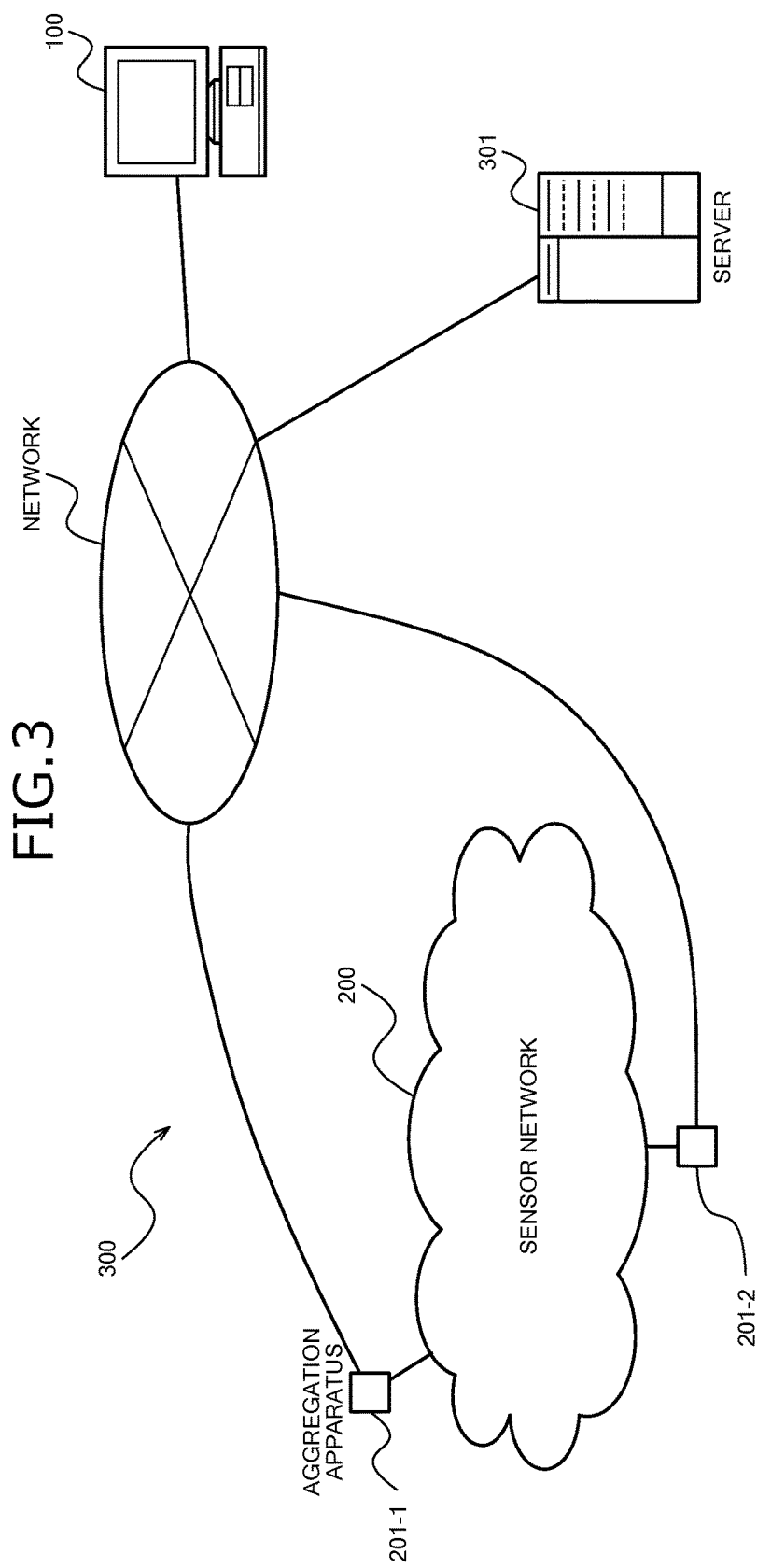

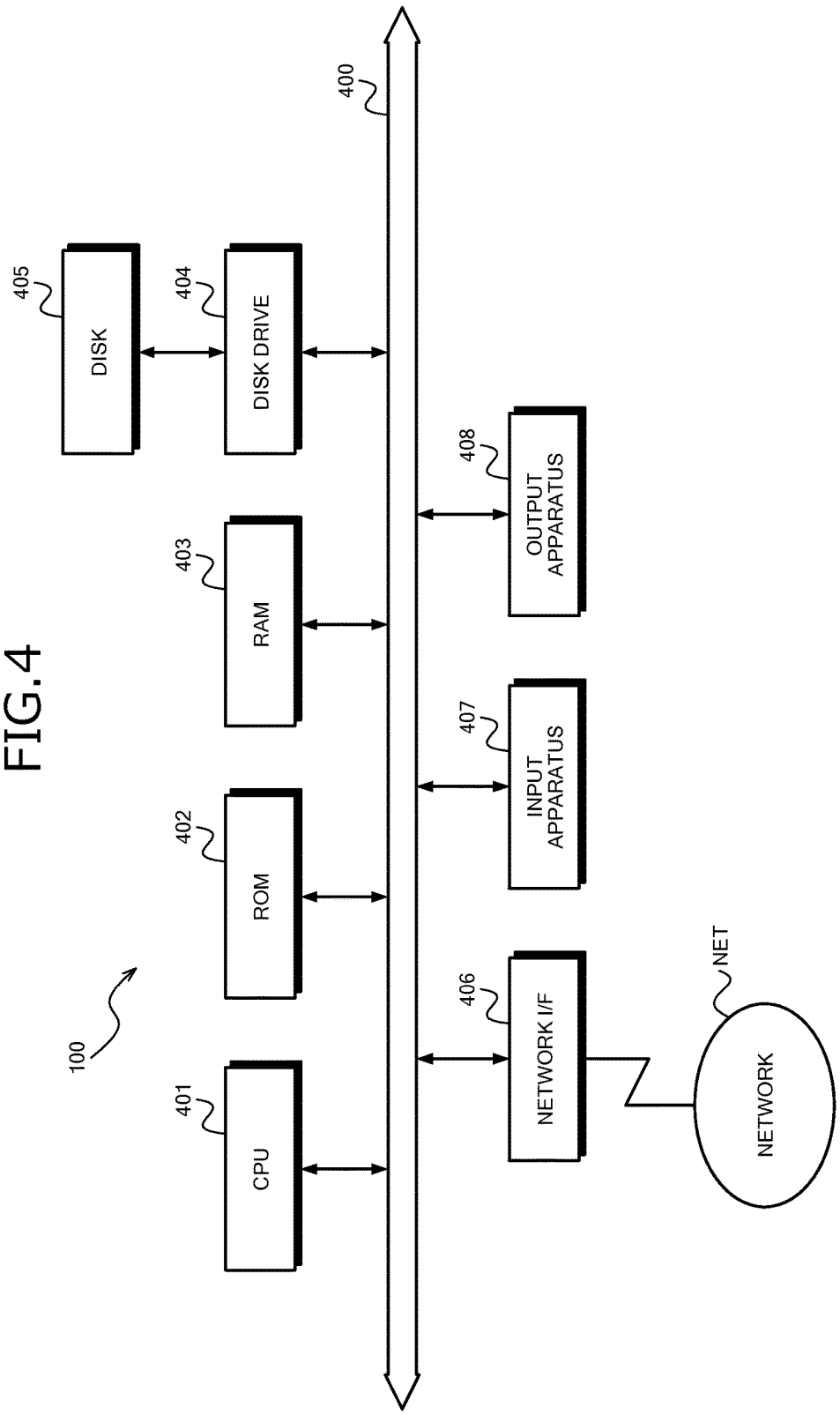

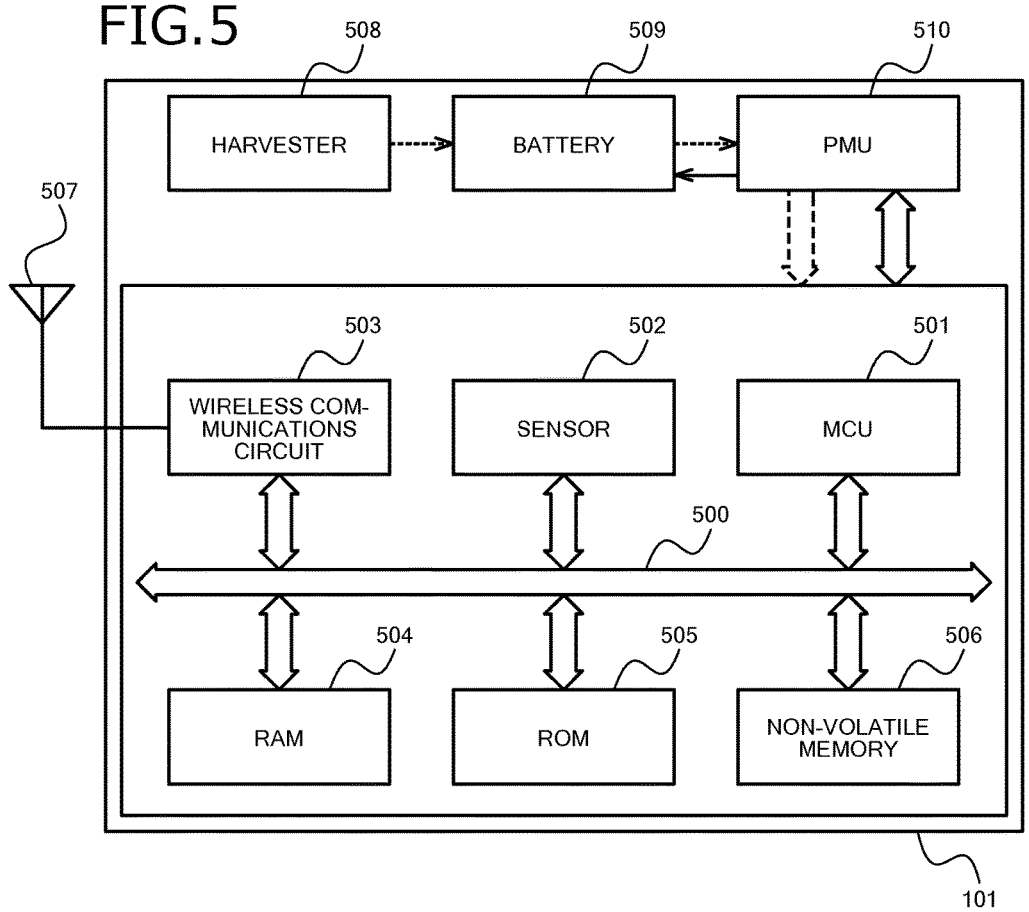

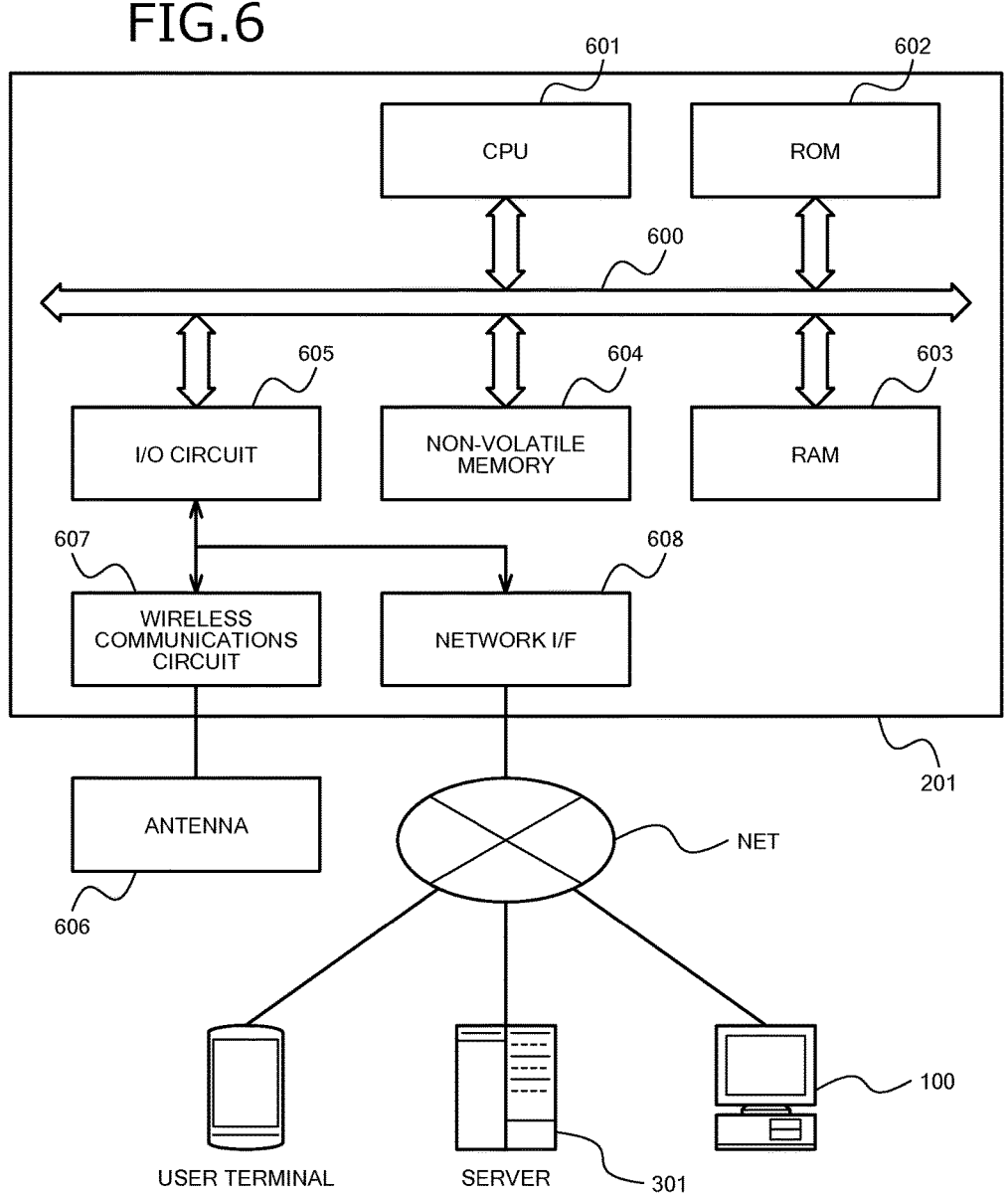

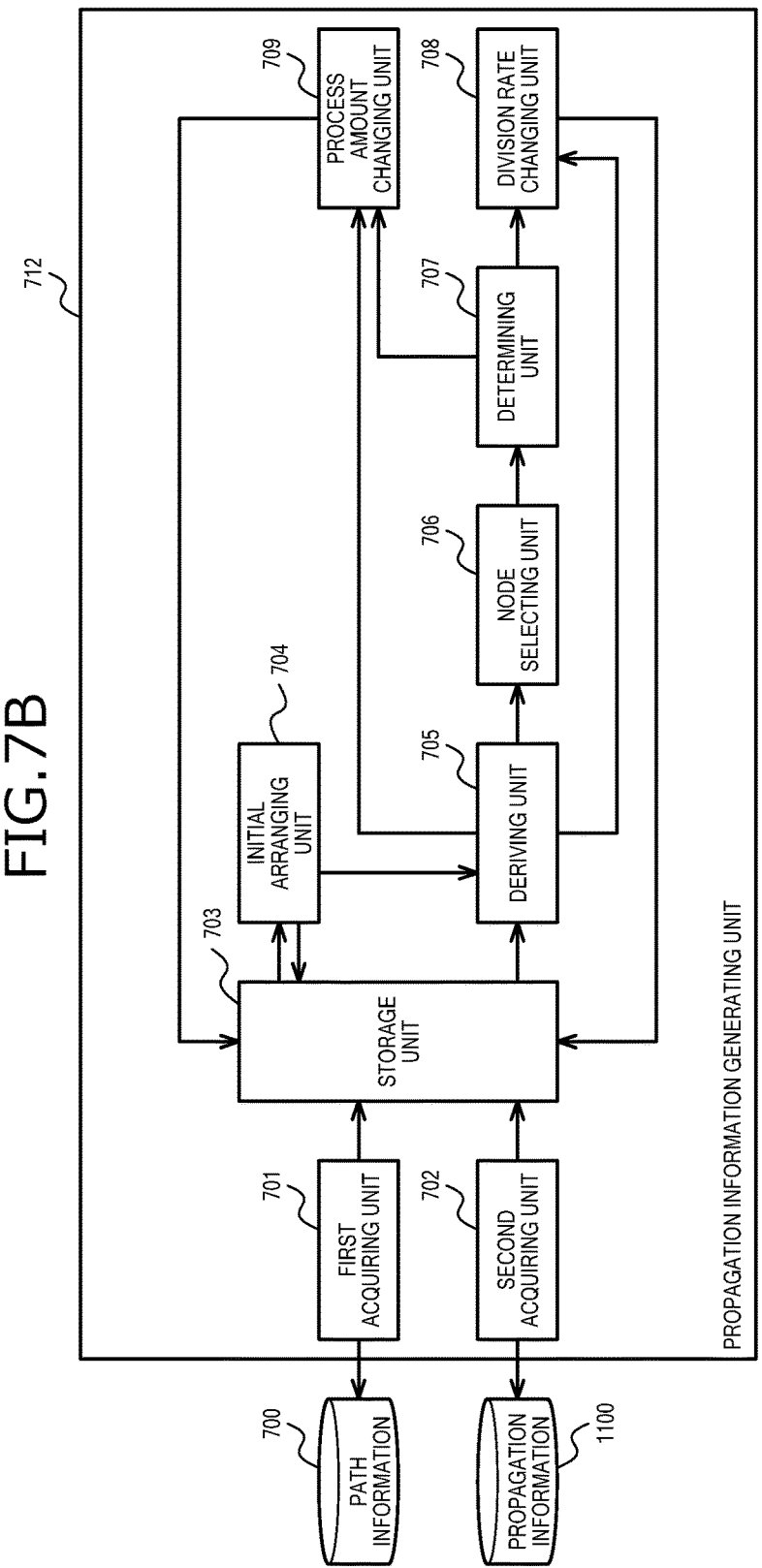

FIG.12

Node A: INPUT/OUTPUT DATA:INA,OUTA INPUT DATA:INB INPUT DATA:INC INPUT DATA:IND TOTAL:80

Node B (SELECTED SENSOR NODE): OUTPUT DATA:OUTA INPUT/OUTPUT DATA:INB, OUTB INPUT DATA:INC INPUT DATA:IND TOTAL:90 — SELECT IND

Node C: INPUT/OUTPUT DATA:OUTA INPUT DATA:OUTB INPUT/OUTPUT DATA:INC, OUTC INPUT DATA:IND TOTAL:80

Node E: INPUT/OUTPUT DATA:INE,OUTE INPUT DATA:INF INPUT DATA:ING INPUT DATA:INH TOTAL:60

Node F: OUTPUT DATA:OUTE-2 INPUT/OUTPUT DATA:INF, OUTF INPUT DATA:INH-2 TOTAL:50

Node G: OUTPUT DATA:OUTE-1 INPUT/OUTPUT DATA:ING, OUTG INPUT DATA:INH-1 TOTAL:70

Node H: OUTPUT DATA:OUTE OUTPUT DATA:OUTF INPUT/OUTPUT DATA:INH, OUTH TOTAL:60

FIRST AGGREGATION APPARATUS 201-1

○ : SENSOR NODE 101

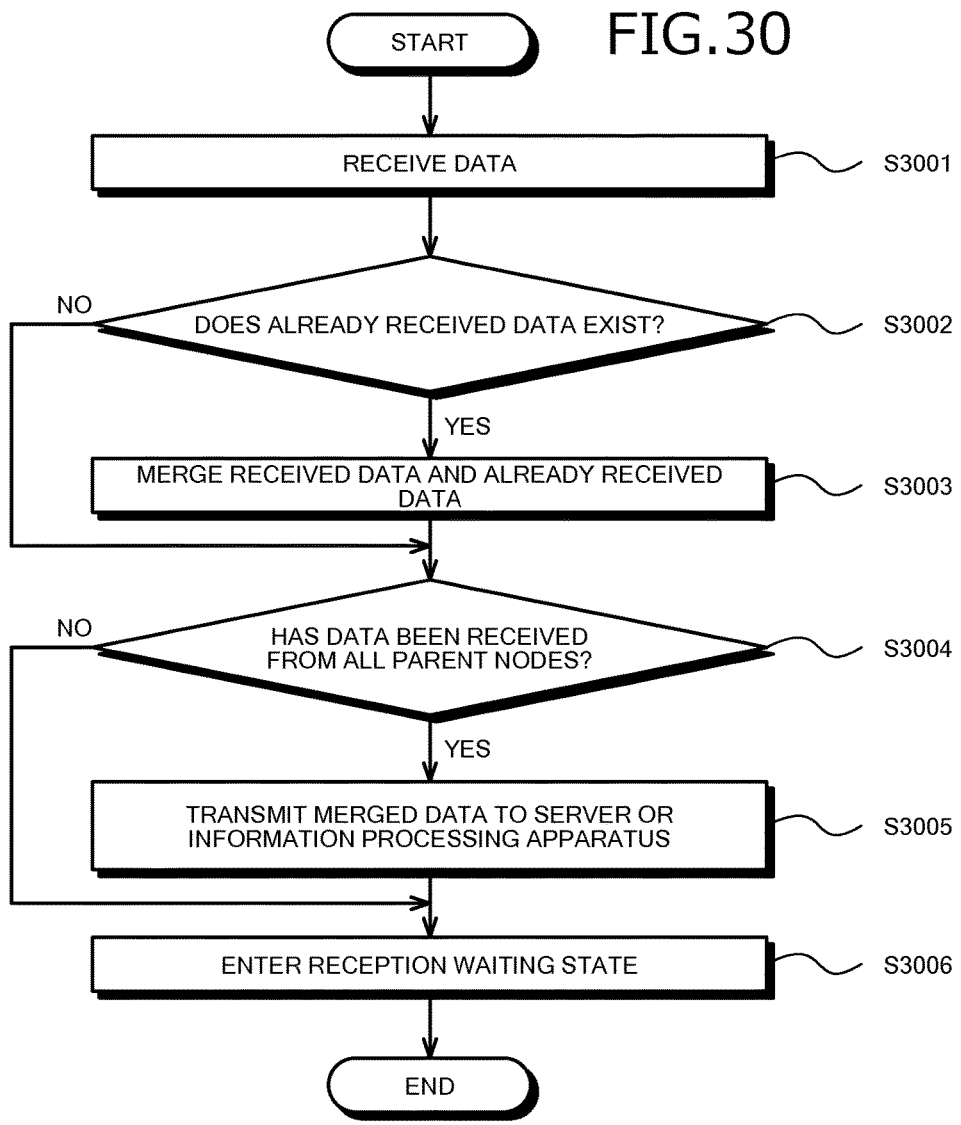

INFORMATION PROCESSING METHOD, COMMUNICATIONS METHOD, COMMUNICATIONS NODE, SYSTEM, AND COMPUTER PRODUCT

CROSS REFERENCE TO RELATED APPLICATIONS

This application is a continuation application of International Application PCT/JP2012/083755, filed on Dec. 26, 2012 and designating the U.S., the entire contents of which are incorporated herein by reference.

FIELD

The embodiments discussed herein are related to an information processing method, a communications method, a communications node, a system, and a computer product.

BACKGROUND

A technique of determining a process to be assigned to a device based on the remaining battery amount of the device and the communication distance to another device is conventionally known as a technique of executing parallel processing by multiple battery driven devices (see, for example, Japanese Laid-Open Patent Publication No. 2012-65166).

A sensor network system (wireless sensor network (WSN)) is known that has multiple wireless terminals equipped with sensors and that are interspersed in a predetermined space to collect environmental and physical statuses in a coordinated manner.

Nonetheless, if data is propagated by multi-hop communication, the data transfer amount among communications nodes differs depending on the data propagation path, arising in a problem of non-uniform power consumption by communications nodes.

SUMMARY

According to an aspect of an embodiment, an information processing method is executed by a computer having a storage device storing therein information. The information processing method includes acquiring and writing path information into the storage device, the path information indicating paths enabling propagation of different data from a first aggregation apparatus to a second aggregation apparatus by multi-hop communication among communications nodes; acquiring and writing propagation information into the storage device, the propagation information indicating for data processes that the communications nodes are requested to execute by the computer, a propagation path among the paths and a communications node on the propagation path and to which execution of the data processes is requested, the propagation path propagating request information requesting the execution of the data processes and a process result of the data processes; deriving power consumptions respectively for each communications node among the communications nodes, based on the path information and the propagation information read from the storage device; selecting a communications node from the communications nodes, based on the derived power consumptions; selecting any one among request information and a process result to be transferred by the selected communications node, based on the propagation information; identifying in a path of the paths when the request information is selected at the selecting, a path that excludes the selected communications node and is from the first aggregation apparatus to the communications node to which a data process relevant to the request information is requested; identifying in a path of the paths when the process result is selected at the selecting, a path that excludes the selected communications node and is from the communications node to which a data process of the process result is requested to the second aggregation apparatus; and generating information indicating that at least a portion of the request information or process result selected at the selecting is propagated through the identified path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of an example of power consumption equalization;

FIG. 2 is an explanatory view of a sensor network example;

FIG. 3 is an explanatory diagram of an example of a system;

FIG. 4 is a block diagram of an example of hardware configuration of an information processing apparatus;

FIG. 5 is a block diagram depicting an example of hardware configuration of a sensor node;

FIG. 6 is a block diagram depicting an example of hardware configuration of an aggregation apparatus;

FIG. 7B is a block diagram of a functional configuration of the information processing apparatus (part two);

FIG. 12 is an explanatory diagram of an example of a division rate change (part one);

FIG. 30 is a flowchart of an example of a process procedure performed by the second aggregation apparatus.

DESCRIPTION OF EMBODIMENTS

Figure 7A:
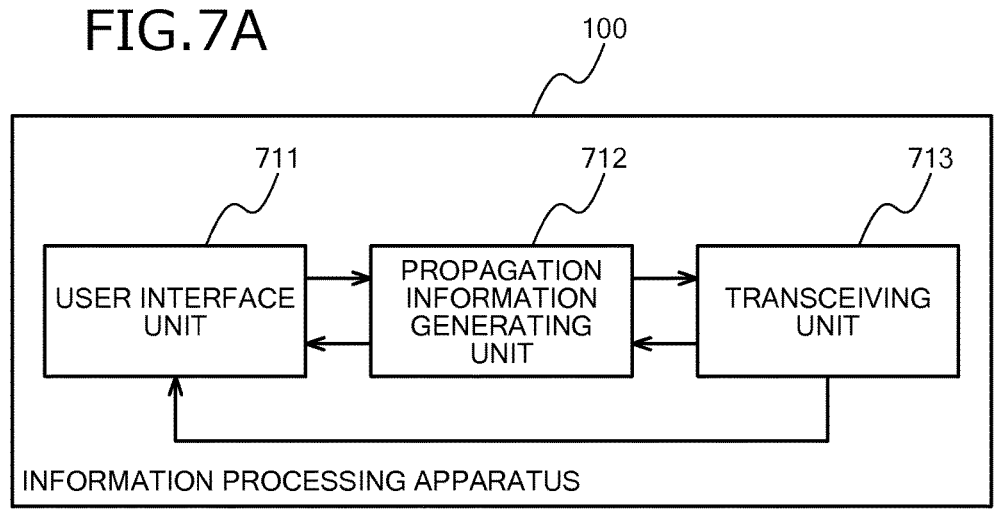
FIG. 7A is a block diagram of a functional configuration of the information processing apparatus (part one)

Embodiments of an information processing method, a communications method, a communications node, a system, and an information processing program according to the present invention will be described in detail with reference to the accompanying drawings. In the present embodiment, the communications nodes are sensor nodes in a sensor network system. For example, although the processor included in an individual sensor node in a sensor network does not have high processing capacity, the processing capacity of the entire sensor network system is increased because of the large number of sensor nodes disposed, e.g., thousands or tens of thousands of sensor nodes. Therefore, in the present embodiment, the sensor network is utilized as a computer resource during a period when sensor nodes are not performing a sensing operation. For example, looped parallel processing without dependency between iterations is performed by the sensor network.

FIG. 1 is an explanatory diagram of an example of power consumption equalization. In a sensor network, multi-hop communication by multiple sensor nodes 101 acting as multiple communications nodes allows data to propagate through multiple paths from a first aggregation apparatus that is a first communications apparatus to a second aggregation apparatus that is a second communications apparatus. Therefore, power consumption of each of the sensor nodes 101 is determined by the data amount required for a data process and the communication volume required for transmission/reception of data related to the data process.

Depending on the propagation path, the sensor nodes 101 may have high power consumption if the transfer data amount is large even though the requested data process amount is small. Therefore, in some of the sensor nodes 101, the electrical power amount enabling a requested data process and data transfer may exceed the electric storage amount of a battery. Since data is transferred by multi-hop communication, if the battery runs out in any of the sensor nodes 101, the data is no longer transferred and looped parallel processing requested to the sensor network may not be completed. Therefore, even if a large number of the sensor nodes 101 have sufficient batteries, a data process cannot be requested to the sensor network. Alternatively, if the battery runs out, the sensor node 101 cannot execute a process related to the node.

Therefore, in the present embodiment, the power consumption of the sensor nodes 101 is equalized by an information processing apparatus 100 so as to prevent the power consumption of the respective sensor nodes 101 from exceeding a storable electrical power amount of the battery. The information processing apparatus 100 is a computer that executes a process of equalizing the power consumption of the sensor nodes 101. FIG. 1 includes sensor nodes 101-1 to 101-7. For example, multiple paths exist for transmission/reception of request information for a data process that the sensor node 101-7 is requested to execute. For example, these paths include two paths, a path from the sensor node 101-3 via the sensor node 101-5 to the sensor node 101-7 and a path from the sensor node 101-3 via the sensor node 101-6 to the sensor node 101-7.

For example, if the sensor node 101-5 has a large power consumption, the information processing apparatus 100 causes a portion of request information for a data process that the sensor node 101-7 is requested to execute, to propagate through a path bypassing the sensor node 101-5. For example, (1) the information processing apparatus 100 changes a division rate at the sensor node 101-3 acting as a branching point for the request information for the data process that the sensor node 101-7 is requested to execute, thereby changing the distribution of the request information. Thus, the power consumption can be equalized.

Alternatively, for example, if the sensor node 101-5 has a large power consumption, (2) the information processing apparatus 100 changes the request recipient of the data process that the sensor node 101-5 is requested to execute, to the sensor node 101-6 in another path. Thus, the power consumption can be equalized.

FIG. 2 is an explanatory view of a sensor network example. A sensor network 200 includes the multiple sensor nodes 101 acting as multiple communications nodes. The sensor network 200 has multiple paths (e.g., rx-1, rx-2, . . . , rx-i) enabling transfer of respective different data from a first aggregation apparatus 201-1 to a second aggregation apparatus 201-2, by multi-hop communication among the multiple sensor nodes 101. Although the sensor nodes 101 depicted in FIG. 2 are connected by solid lines, the solid lines actually represent paths in the multi-hop communication. The multiple paths are referred to as a network configuration or a network topology, and information indicating the multiple paths is referred to as path information.

Although the method of building the sensor network 200 is not particularly limited, an example will briefly be described. For example, first, (a) each of the sensor nodes 101 connects through wireless communication to all neighboring sensor nodes 101 within a range of short-distance wireless communication. (b) The multiple sensor nodes 101 cause surrounding sensor nodes to perform relay transfer of empty data from the first aggregation apparatus 201-1 by the multi-hop communication, and each of the sensor nodes 101 measures the shortest hop count from the first aggregation apparatus 201-1 to the sensor node 101.

(c) Each of the sensor nodes 101 regards sensor nodes 101 having a hop count smaller than the sensor node 101 as parent nodes among the neighboring sensor nodes 101 connected at (a). Each of the sensor nodes 101 regards sensor nodes 101 having a larger hop count as child nodes among the sensor nodes 101 having a connected relationship. Each of the sensor nodes 101 regards nodes having the same hop count as sibling nodes among the sensor nodes 101 having a connected relationship. Each of the sensor nodes 101 terminates the connection to the sibling nodes and maintains the connection to the parent node if only one parent node exists, or retains the connection only to the parent node closest to the first aggregation apparatus 201-1 and terminates the connection to the other parent nodes if multiple parent nodes exist. As a result, the sensor network 200 can be built.

The second aggregation apparatus 201-2 can acquire the built network configuration by collecting the information of the connected sensor nodes 101 from each of the sensor nodes 101. As described above, this method is not a limitation and networks built by various methods may be utilized in the present embodiment.

Even a single sensor network 200 has multiple network configurations depending on the paths of the multi-hop communication. Although two aggregation apparatuses 201 are included in this example, the number of the aggregation apparatuses may be one, three, or more.

FIG. 3 is an explanatory diagram of an example of a system. In a system 300, the information processing apparatus 100 requesting a looped process causes the execution of the looped process by utilizing the sensor network 200. For example, the system 300 has the sensor network 200, the aggregation apparatuses 201 that are communication apparatuses, and the information processing apparatus 100. The information processing apparatus 100 is connected via a network NET to each of the aggregation apparatuses 201.

FIG. 4 is a block diagram of an example of hardware configuration of the information processing apparatus. In FIG. 4, the information processing apparatus 100 has a CPU 401, ROM 402, RAM 403, a disk drive 404, and a disk 40. The information processing apparatus 100 further has a network I/F 406, an input apparatus 407, and an output apparatus 408. The components are connected respectively by a bus 400.

Here, the CPU 401 governs overall control of the information processing apparatus 100. The ROM 402 stores a program such a boot program. The RAM 403 is a storage unit used as a work area of the CPU 401. The disk drive 404, under the control of the CPU 401, controls the reading and writing of data with respect to the disk 405. The disk 405 stores data written thereto under the control of the disk drive 404. A magnetic disk, an optical disk, etc. can be given as examples of the disk 405.

The network I/F 406 is connected, via a communications line, to a network NET such as a local area network, a wide area network, and the Internet. The network I/F 406 administers an internal interface with the network NET and controls the input and output of data with respect to an external apparatus. A modem, LAN adapter, etc. can be used as the network I/F 406, for example.

The input apparatus 407 is an interface that performs input various types of data via user operation of a keyboard, a mouse, a touch panel, etc. The input apparatus 407 can further take in images and moving pictures from a camera and sound from a microphone. The output apparatus 408 is an interface that performs output of data according to an instruction of the CPU 401. A display, printer, etc. may be given as an example of the output apparatus 408.

FIG. 5 is a block diagram depicting an example of hardware configuration of a sensor node. The sensor node 101 has a microprocessor (hereinafter, "micro control unit (MCU)") 501, a sensor 502, a wireless communications circuit 503, RAM 504, ROM 505, non-volatile memory 506, an antenna 507, a harvester 508, a battery 509, and a power management unit (PMU) 510. The sensor node 101 further has an internal bus 500 that connects the MCU 501, the sensor 502, the wireless communications circuit 503, the RAM 504, the ROM 505, and the non-volatile memory 506. In FIG. 5, dotted lined arrows indicate electrical power lines and solid lined arrows indicate data lines.

The sensor 502 detects a given variation at the installation site. The sensor 502 may be, for example, a piezoelectric element that detects a pressure at the installation site, an element that detects temperature, a photoelectric element that detects light, etc. The antenna 507 transmits and receives radio waves wirelessly communicated with the aggregation apparatus 201. The wireless communications circuit 503 (Radio Frequency (RF)) outputs received radio waves as a reception signal and transmits transmission signals as radio waves through the antenna 507.

The MCU 501 manages data output by the sensor 502. The RAM 504 stores transient data of processing at the MCU 501. The RAM 504 stores transient data of processing at the MCU 501. The ROM 505 stores process programs, etc. executed by the MCU 501. The non-volatile memory 506 is writable memory and retains given data written thereto even when the power supply is suspended. For example, the writable non-volatile memory 506 may be flash memory.

The harvester 508 generates power based on energy changes such as variations in light, oscillation, temperature, radio waves (received radio waves), etc. in the external environment at the installation site of the sensor node 101, for example. The harvester 508 may generate power according to the variations detected by the sensor 502. The battery 509 stores the power generated by the harvester 508. In other words, the sensor node 101 does not need a secondary battery or external power source and internally generates power. The PMU 510 controls the supply of the power stored by the battery 509, as a drive source of the components of the sensor node 101.

FIG. 6 is a block diagram depicting an example of hardware configuration of an aggregation apparatus. The aggregation apparatus 201, unlike the sensor node 101, operates on external power source. The aggregation apparatus 201 has a more sophisticated processor (CPU 601) than the MCU 501 of the sensor node 101; large capacity ROM 602, RAM 603, and non-volatile memory 604, and an interface (Input/Output (I/O)) circuit 605. The aggregation apparatus 201 further has a bus 600 that connects the CPU 601, the ROM 602, the RAM 603, the non-volatile memory 604, and the I/O circuit 605.

The I/O circuit 605 is further connected to an antenna 606, a wireless communications circuit (RF) 607, and a network I/F 608, whereby the aggregation apparatus 201 can wirelessly communicate with the sensor nodes 101 through the antenna 606 and the wireless communications circuit 607. Further, the aggregation apparatus 201 can communicate with external apparatuses such as the information processing apparatus 100, the server 301, a user terminal, etc. on the network NET such as the Internet, by a TCP/IP protocol process via the network I/F 608.

Figure 8:
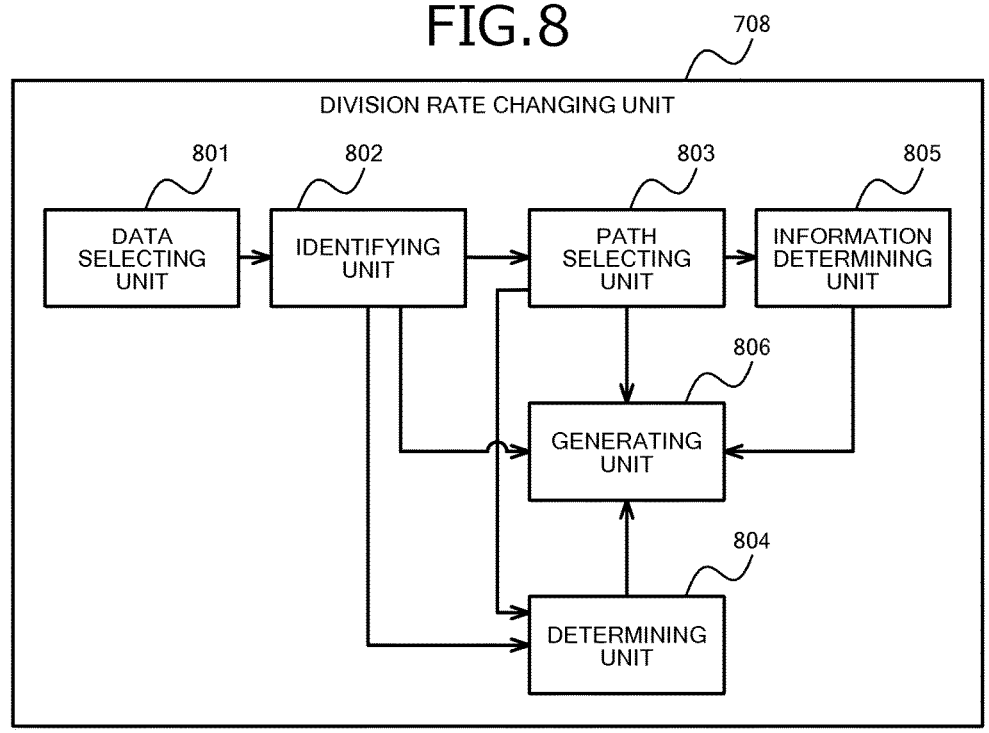
FIG. 8 is a detailed block diagram of a division rate changing unit.
Figure 9:
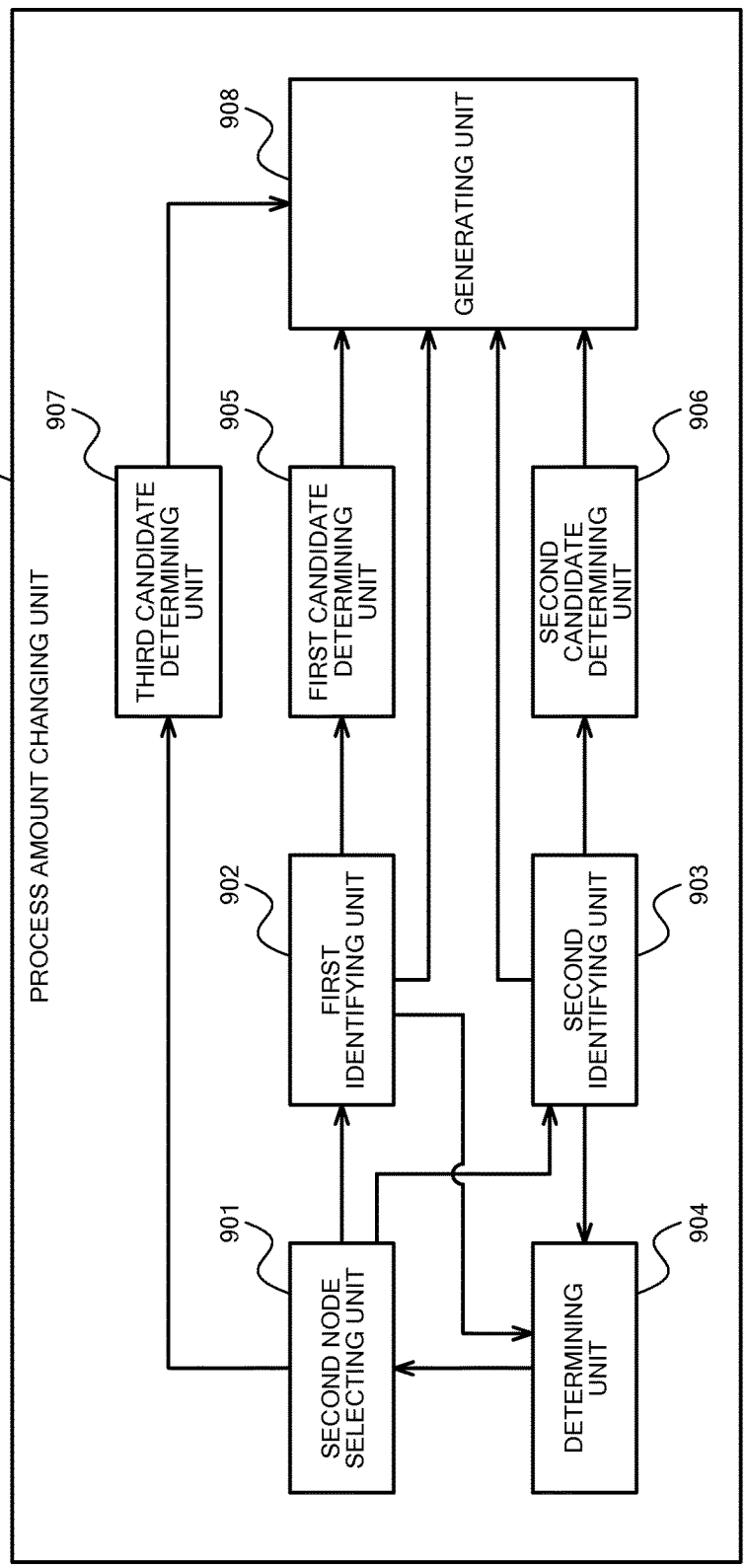
FIG. 9 is a detailed block diagram of a process amount changing unit.

FIGS. 7A and 7B are block diagrams of a functional configuration of the information processing apparatus. FIG. 8 is a detailed block diagram of a division rate changing unit. FIG. 9 is a detailed block diagram of a process amount changing unit. The information processing apparatus 100 has a user interface unit 711, a propagation information generating unit 712, and a transceiving unit 713.

The user interface unit 711 receives a command such as a data process request, etc. from the user. The user interface unit 711 displays a process result of a data process request. For example, the user interface unit 711 receives the command via the input apparatus 407 and outputs the process result through the output apparatus 408.

The propagation information generating unit 712 generates propagation information concerning a data process requested from the user to the sensor network 200. Details of the propagation information generating unit 712 will be described later.

The transceiving unit 713 transmits the propagation information generated by the propagation information generating unit 712 to the first aggregation apparatus 201-1. The transceiving unit 713 receives the process result from the second aggregation apparatus 201-2. For example, the transceiving unit 713 is realized by the network I/F 406.

The propagation information generating unit 712 will be described in detail. As depicted in FIG. 7B, the propagation information generating unit 712 has a first acquiring unit 701, a second acquiring unit 702, a storage unit 703, an initial arranging unit 704, a deriving unit 705, a node selecting unit 706, a determining unit 707, a division rate changing unit 708, and a process amount changing unit 709. The storage unit 703 is realized by the RAM 403, for example. The processes of the units other than the storage unit 703 are encoded in an information processing program stored in a storage device that can be accessed by the CPU 401, for example. The CPU 401 reads the information processing program from the storage device and executes the processes encoded in the information processing program. As a result, the processes of the units are realized. The process results of the units are stored in a storage device such as the RAM 403 and the disk 405.

The first acquiring unit 701 acquires path information 700 indicating multiple paths enabling transfer of respective different data from the first aggregation apparatus 201-1 to the second aggregation apparatus 201-2 by multi-hop communication among the sensor nodes 101 and writes the information into the storage unit 703. The multiple paths include the example as described with reference to FIG. 2. With regard to a form of acquisition, the information may be acquired from another apparatus such as the server 301 via the network NET, may be received as input from the input apparatus 407, or may be read from a storage device such as the disk 405.

The information processing apparatus 100 performs initial arrangement by using the initial arranging unit 704. With regard to an initial arrangement method, for example, the initial arranging unit 704 equally divides the iteration count for a loop by N and assigns data related to the divided iteration count to the sensor nodes 101. The initial arranging unit 704 assigns remainder iterations to the sensor nodes 101 such that the iteration counts of the loop for each of the sensor nodes 101 are equalized as far as possible. For example, when dividing a looped process of ten rounds by four, the initial arranging unit 704 divides the looped process into 2, 2, 3, 3. The looped process may be divided into 2, 3, 2, 3 or 3, 3, 2, 2 without particular limitation at the time of the initial arrangement.

If one path exists from the first aggregation apparatus 201-1 to a given sensor node 101, the sensor nodes 101 on the path transfer the request information of the data process that the given sensor node 101 is requested to execute. The request information requesting the execution of the data process is referred to as input data. If multiple paths exist from the first aggregation apparatus 201-1 to the given sensor node 101, the input data may be divided at a sensor node 101 that is a branching point of the paths. The initial arranging unit 704 determines the propagation path such that the input data is equally divided by the number of branches at the sensor node 101 that is the branching point.

Similarly, with regard to output data, if one path to the second aggregation apparatus 201-2 exists from the given sensor node 101, the sensor nodes 101 on the path transfer a process request of the data process and for which the given sensor node 101 is set as the request recipient. The process request for the data process is referred to as output data. If multiple paths exist from the given sensor node 101 to the second aggregation apparatus 201-2, the output data executed by the given sensor node 101 may be divided at the sensor node 101 that is a branching point of the paths. The initial arranging unit 704 determines the propagation path such that the output data is equally divided by the number of branches at the sensor node 101 that is the branching point.

The initial arranging unit 704 can calculate an input/output data amount (Dh) passing through each of the sensor nodes 101 by determining the propagation paths in the initial arrangement of the input data and the output data that each of the sensor nodes 101 is requested to execute. The initial arranging unit 704 generates propagation information 1100 indicating the propagation paths and the sensor nodes 101 that among the sensor nodes 101 included in the propagation paths, are to execute the data processes and writes the information into the storage unit 703.

The second acquiring unit 702 acquires and writes the propagation information 100 into the storage unit 703. With regard to a form of acquisition, the information may be input via the input apparatus 407 by a user or may be acquired by reading the propagation information 100 stored in the storage device such as the disk 405. The acquired propagation information 1100 may be the propagation information 1100 acquired by the initial arranging unit 704 or may be the propagation information 1100 created by a user. The acquired propagation information 1100 may be the propagation information 1100 acquired again after the process amount and the division rate are changed by the division rate changing unit 708 and the process amount changing unit 709 described later. The propagation information 1100 indicates, for multiple data processes, the propagation paths that among the multiple paths, enable propagation of the request information and the process result of the data processes and the sensor nodes 101 that among the sensor nodes 101 included in the propagation paths, are to execute the data processes. A detailed example of the propagation information 1100 will be described later with reference to FIG. 11.

Figure 10:
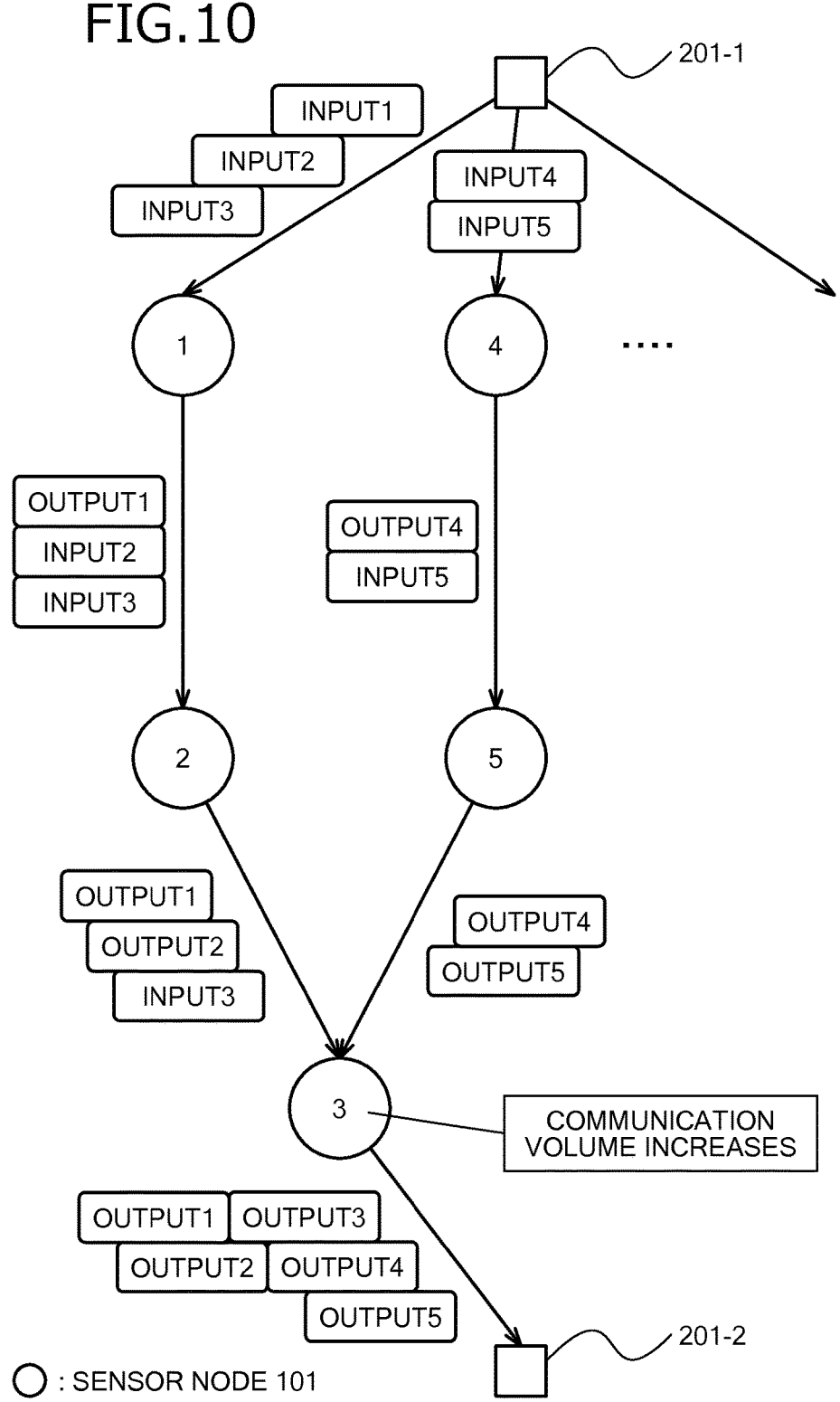
FIG. 10 is an explanatory diagram of a calculation example of power consumption.

FIG. 10 is an explanatory diagram of a calculation example of power consumption. In the example depicted in FIG. 10, input or output indicates input data or output data and a number assigned to the input or output indicates a request recipient of a data process for the input data or output data. In the example depicted in FIG. 10, for example, a sensor node 101-3 at a merging point having multiple parent nodes has an increased communication volume and therefore, the power consumption becomes large.

The deriving unit 705 derives the power consumption of each of the sensor nodes 101 based on the path information 700 and the propagation information 1100. For example, an input/output data amount per iteration is stored in the storage device such as the RAM 403 and the disk 405. Based on the input/output data amount per iteration, the deriving unit 705 can calculate a data process amount (C), an input/output data amount (Dh) for a requested data process, a transferred input data amount (Di), and a transferred output data amount (Do) of each of the sensor nodes 101.

In the sensor network 200 of the multi-hop communication mode, the input data goes from the first aggregation apparatus 201-1 through several parent nodes and arrives at the sensor node 101 of the request recipient. As described above, the parent nodes mean the sensor nodes 101 that transfer the input data of the corresponding data process on the path from the first aggregation apparatus 201-1 to the request recipient of the data process. The output data after the data process by the sensor node 101 that is the request recipient is transmitted via several child nodes to the second aggregation apparatus 201-2. As described above, the child nodes mean the sensor nodes 101 that transfer the output data of the corresponding data process on the path from the request recipient of the data process to the second aggregation apparatus 201-2.

Consequently, the power consumption of each of the sensor nodes 101 is determined by the power consumption required for a data process, the power consumption required for communication of input/output data of the data process, and the power consumption required for communication of transferred input/output data.

Therefore, the deriving unit 705 acquires from the design information of the sensor node 101, the power consumption per unit data process amount (Pp), a transmission electrical power amount per unit data amount (Ps), and a reception electrical power amount per unit data amount (Pr). The design information of the sensor node 101 may be acquired via the network NET from the server 301 or may be input by the user. The design information is pre-stored in the storage device such as the RAM 403 and the disk 405. The deriving unit 705 calculates the power consumption of each of the sensor nodes 101 based on Equation (1).

$$\text{The power consumption of the sensor node } 101 = C \times Pp + I \times Pr + O \times Ps + Dh \times (Pr + Ps) \quad (1)$$

I is the received data amount and O is the transmitted data amount. Taking the sensor node 101-3 depicted in FIG. 10 as an example, the deriving unit 705 can calculate the power consumption required for reception of output data 1, 2, 4, and 5, the data process amount (C), the input data amount (Di), and the output data amount (Do), for each of the sensor nodes 101. The deriving unit 705 calculates the data process amount (C) based on the input data 3 and calculates the input/output data amount (Dh) based on the input data 3 and the output data 3. The deriving unit 705 calculates the received data amount (I) and the transmitted data amount (O) from the output data 1, 2, 4, and 5. The deriving unit 705 substitutes the calculated information into Equation (1) to derive the power consumption of the sensor node 101-3.

Figure 11:
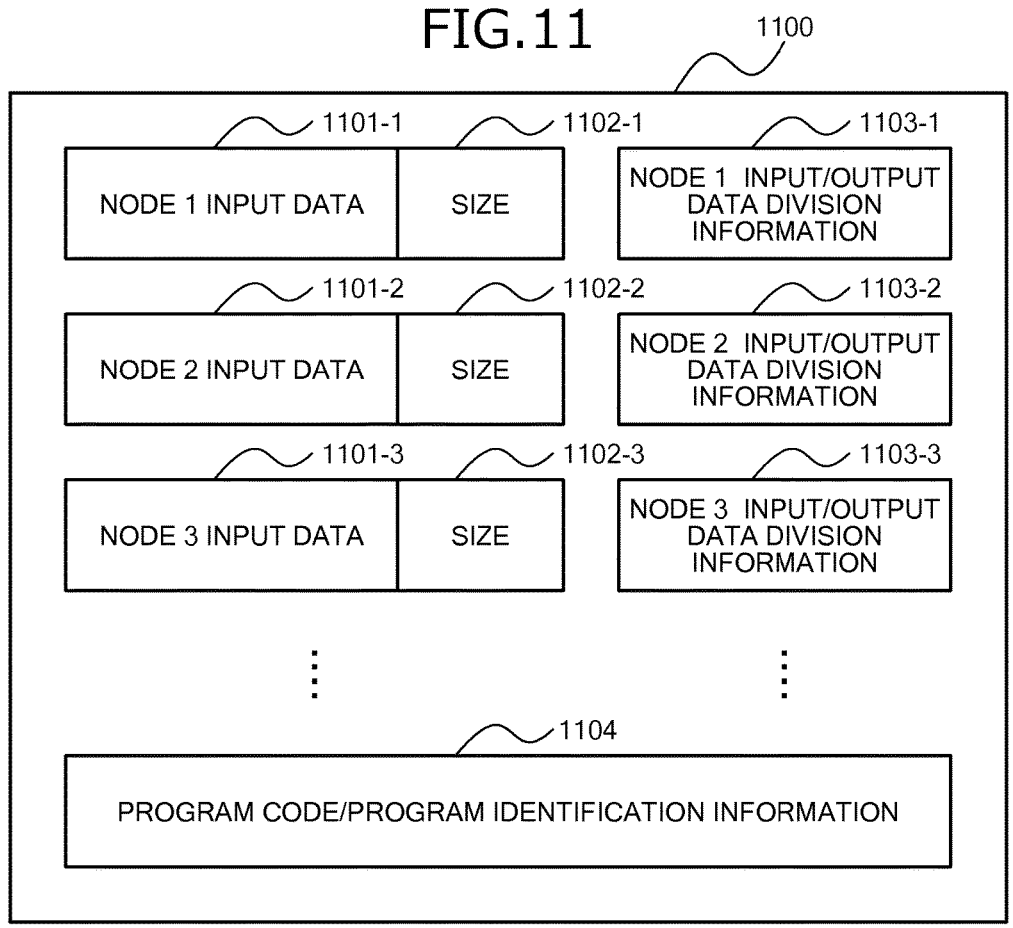
FIG. 11 is an explanatory diagram of a propagation information example.

FIG. 11 is an explanatory diagram of a propagation information example. Propagation information 1100 includes input data 1101 for a requested data process, a size 102 of the input data, division information 1103, and program code or program identification information 1104 of the data process related to the looped process. The division information 1103 includes information indicating a rate of division of the input or output data for each of the child nodes at the sensor node 101 that is a branching point, i.e., the sensor node 101 having multiple child nodes. For example, the division information 1103 is information indicating that the output data of the sensor node 101-1 is divided at the sensor node 101-3 as 50[percent] of the data being transmitted to the sensor node 101-4 and 50[percent] of the data being transmitted to the sensor node 101-5. The propagation information 1100 has the division information 1103 for all the sensor nodes 101 that are branching points through which the output data passes.

Equalization will be described. As described with reference to FIG. 1, the equalization includes a change in data process amount and a change in division rate at the sensor node 101 that is a branching point. Configuration may be such that the information processing apparatus 100 makes either a change in data process amount or a change in division rate at the sensor node 101 that is a branching point. Alternatively, for example, if the information processing apparatus 100 makes either one of the changes and the change cannot be achieved, the information processing apparatus 100 may make the other change. For example, if the change still cannot be achieved, the information processing apparatus 100 may be unable to make a request for the looped process to the sensor network 200.

First, the node selecting unit 706 selects any one sensor node 101 from among the sensor nodes 101, based on the derived power consumption. For example, the node selecting unit 706 selects the sensor node 101 having the largest power consumption among the sensor nodes 101, based on the derived power consumption.

The determining unit 707 makes a comparison in the power consumption of the selected sensor node 101 between the power consumption required for transfer of input/output data having a request recipient set to another one of the sensor nodes 101 and the power consumption required for the data process requested to the selected sensor node 101. For example, the determining unit 707 compares the two power consumptions to determine which power consumption is larger.

If a larger power consumption is required for transfer of the input/output data transferred by the selected sensor node 101, the division rate changing unit 708 changes the propagation path of the input/output data transferred by the selected sensor node 101. The division rate changing unit 708 has a data selecting unit 801, an identifying unit 802, a path selecting unit 803, a determining unit 804, an information determining unit 805, and a generating unit 806.

On the other hand, if a larger power consumption is required for the data process requested to the selected sensor node 101, the process amount changing unit 709 changes the request recipient of the data process that the selected sensor node 101 is requested to execute, to another one of the sensor nodes 101. The process amount changing unit 709 has a second node selecting unit 901, a first identifying unit 902, a second identifying unit 903, a determining unit 904, a first candidate determining unit 905, a second candidate determining unit 906, a third candidate determining unit 907, and a generating unit 908.

An example of division rate change by the division rate changing unit 708 will be described before description of an example of a process amount change by the process amount changing unit 709.

FIG. 12 is an explanatory diagram of an example of a division rate change (part one). As described above, the node selecting unit 706 selects any one sensor node 101 among the sensor nodes 101, based on the derived power consumption. In the example depicted in FIG. 12, a sensor node 101-B is selected. The sensor node selected in this case will be referred to as the selected sensor node 101.

Based on the propagation information 1100, the data selecting unit 801 selects from among the input or output data, the input or output data to be transferred by the sensor node 101 selected by the node selecting unit 706. The data transferred by the sensor node 101-B is input data INC, IND, and output data OUTA. Input data INB and output data OUTB are data of the data process for which the request recipient is set to the sensor node 101-B and therefore, are not transferred data. For example, the data selecting unit 801 selects the input or output data having the largest size among the input or output data transferred by the selected sensor node 101. In the example depicted in FIG. 12, the input data IND to a sensor node 101-D is selected.

Figure 13:
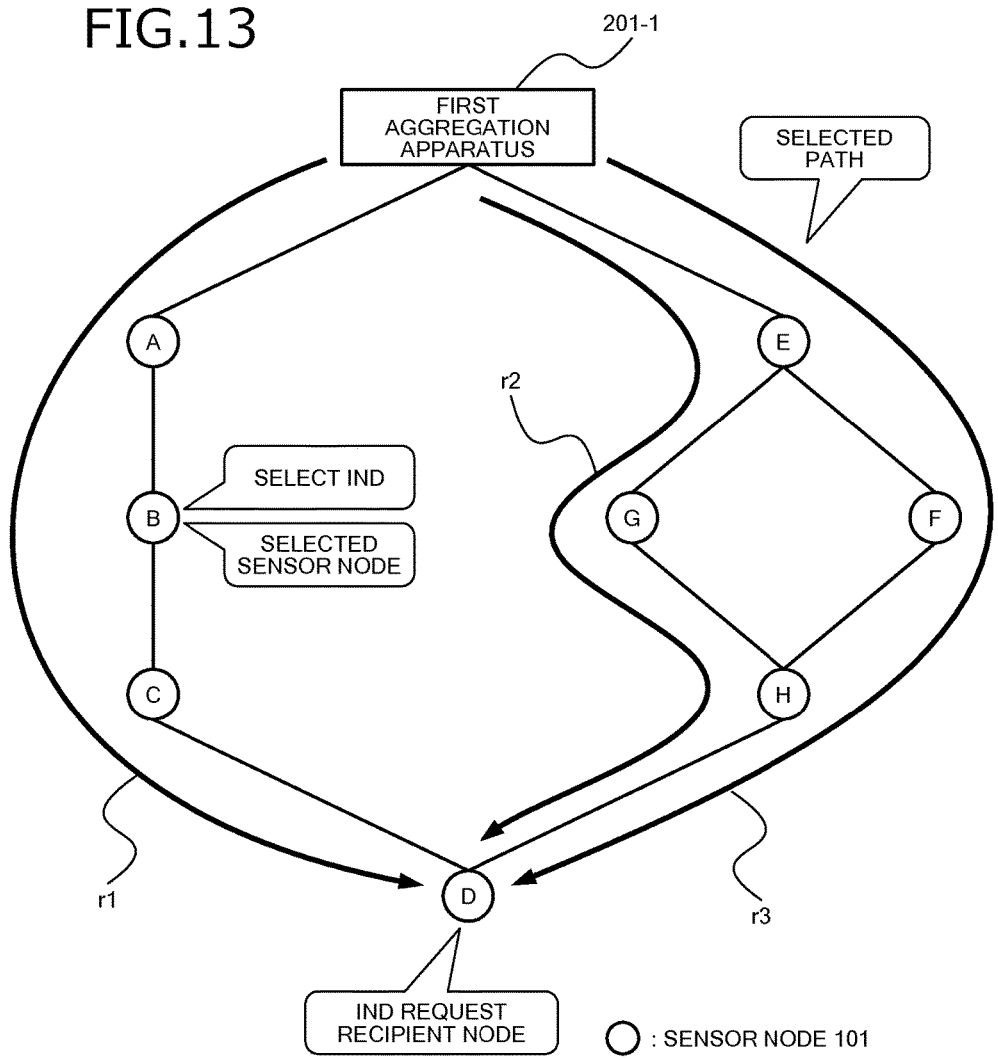
FIG. 13 is an explanatory diagram of the example of a division rate change (part two)

FIG. 13 is an explanatory diagram of the example of a division rate change (part two). If the input data is selected, the identifying unit 802 searches for a path that is included in a path among the multiple paths and that is from the first aggregation apparatus 201-1 to the sensor node 101 that is the request recipient of the data process for the selected input data. The identifying unit 802 identifies among retrieved paths, a path that does not pass through the selected sensor node 101. On the other hand, if the output data is selected, the identifying unit 802 searches for a path that is included in a path among the multiple paths and that is from the sensor node 101 that is the request recipient of the data process for the output data to the second aggregation apparatus 201-2. The identifying unit 802 identifies among retrieved paths, a path that does not pass through the selected sensor node 101. Since the input data IND is selected in the example depicted in FIG. 13, paths r2, r3, which do not pass through the selected sensor node 101 are identified among paths r1 to r3 from the first aggregation apparatus 201-1 to the sensor node 101-D.

Since multiple paths are identified, the path selecting unit 803 selects the path in which the largest power consumption of a sensor node 101 on the identified path is smallest. In the example depicted in FIG. 13, the largest power consumption on the identified path is 70 in the path r2 and 60 in the path r3 and therefore, the path selecting unit 803 selects the path r3. The determining unit 804 determines if the largest power consumption on the selected path is a threshold value or greater. This threshold value is a value based on the electrical power amount that can be stored in the battery 509 included in the sensor node 101, for example. In particular, for example, the threshold value may be the storable electrical power amount itself or may be a value acquired by subtracting a certain proportion from the storable electrical power amount with consideration of an error in estimation.

If the largest power consumption on the selected path is the threshold value or greater, the generating unit 806 generates information indicating the propagation through the propagation path indicated by the read propagation information 1100. For example, the generating unit 806 may generate information indicating a failure to change the division rate.

If the largest power consumption on the selected path is less than the threshold value, the generating unit 806 generates information indicating that at least a portion of the selected input or output data is propagated through the selected path.

The information determining unit 805 determines from among the selected input or output data, the data to be propagated through the selected path. For example, the information determining unit 805 determines the data to be propagated through the selected path based on the difference of the power consumption of the selected sensor node 101 and the largest power consumption of a sensor node 101 on the selected path. In particular, for example, the information determining unit 805 calculates "(the power consumption of the selected sensor node 101–the largest power consumption of the sensor node 101 on the selected path)/2". For example, the information determining unit 805 calculates a data amount corresponding to the calculated electrical power amount to determine among the selected input or output data, the data to be propagated through the selected path.

The generating unit 806 generates information indicating that the data determined by the information determining unit 805 is propagated through the selected path. For example, the generating unit 806 generates the propagation information 1100 having the propagation path indicated by the propagation information 1100 changed such that the determined data is propagated through the selected path. In particular, the generating unit 806 newly generates the propagation information 1100 in which a division rate of the division information included in the propagation information 1100 is changed. In the example depicted in FIG. 13, when a value is acquired by subtracting the largest power consumption of a sensor node 101 on the path r3, i.e., 60, from the power consumption of the selected sensor node 101, i.e., 90, and is divided by two, the result is 15. The generating unit 806 changes the division rate at the sensor nodes 101 acting as the branching points such that the request information applied to the path r1 is partially applied to the path r3 by an amount corresponding to the power consumption of 15.

Figure 14:
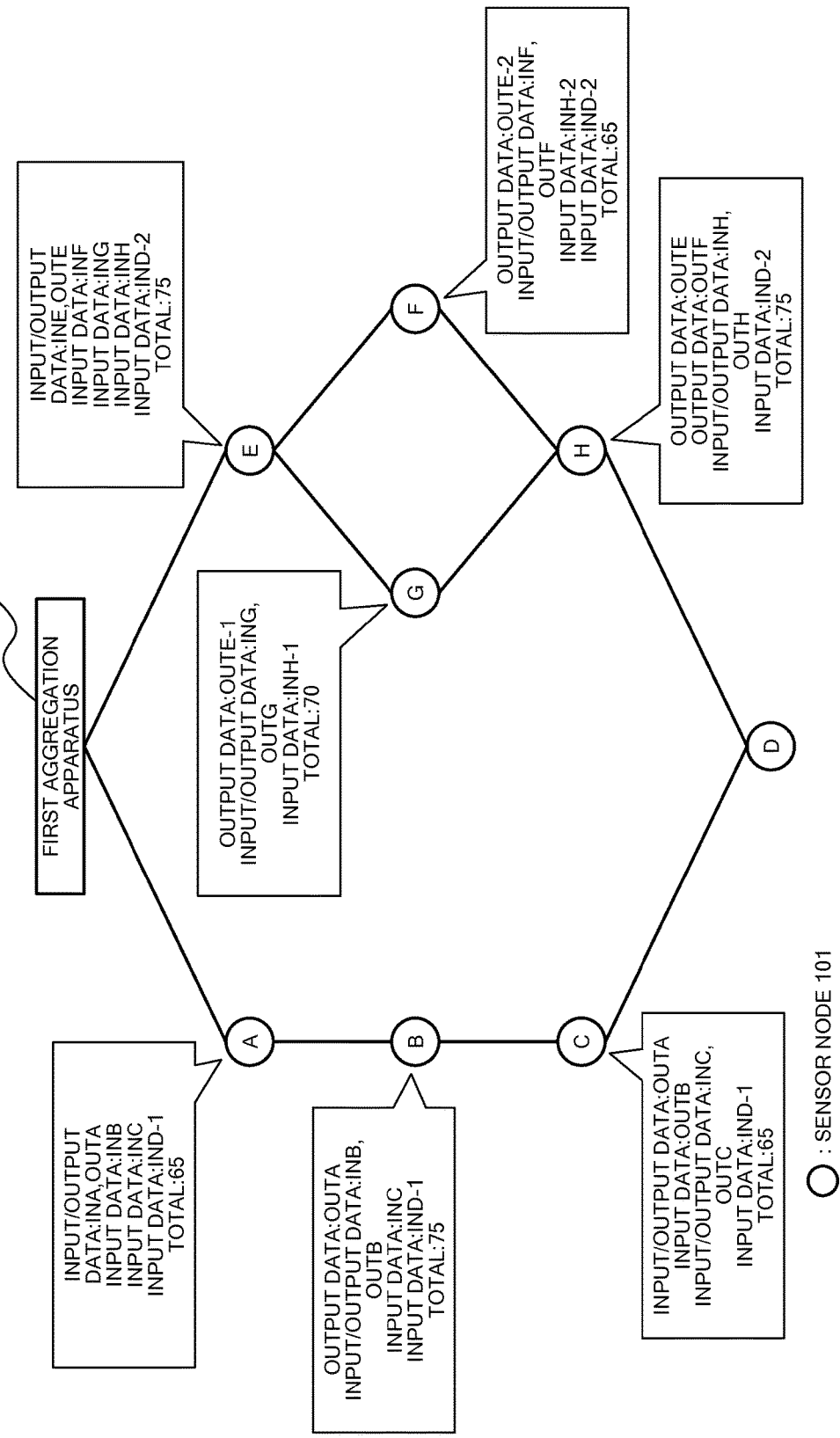
FIG. 14 is an explanatory diagram of the example of a division rate change (part three)

FIG. 14 is an explanatory diagram of the example of a division rate change (part three). In the example depicted in FIG. 14, the input data IND is divided by the first aggregation apparatus 201-1 into IND-1 and IND-2. The input data IND-1 is propagated through the path passing through the sensor node 101-A and the input data IND-2 is propagated through the path going through a sensor node 101-E and a sensor node 101-F. FIG. 14 depicts an example when the deriving unit 705 derives the power consumptions of the sensor nodes 101 again based on the newly generated propagation information 1100. The largest power consumption is 75. Therefore, the power consumption in the sensor network 200 is equalized more than before the change.

Figure 15:
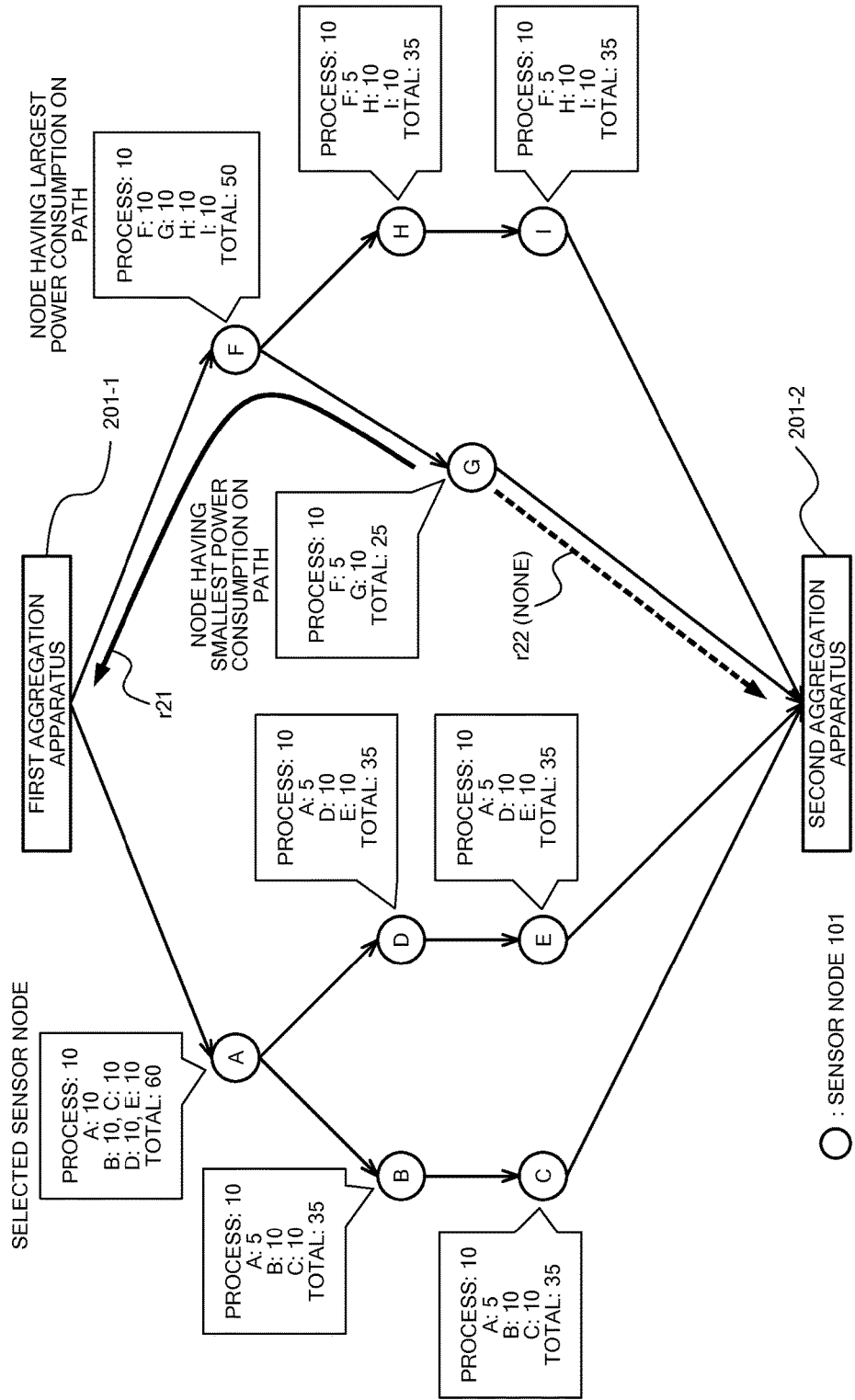
FIG. 15 is an explanatory diagram of an example of a process amount change (part one)

FIG. 15 is an explanatory diagram of an example of a process amount change (part one). The example in FIG. 15 depicts the first aggregation apparatus 201-1, the second aggregation apparatus 201-2, and the sensor nodes 101 from A to I. A detailed method of deriving the power consumption of the sensor node 101 is the same as the example described above. In a balloon of each of the sensor nodes 101, the power consumptions associated with the process and communication in each of the sensor nodes 101 are described. For example, in the sensor node 101-A, the power consumption of the data process is 10, and the power consumption for transmitting/receiving the input/output data of the data process (indicated by "A:" in FIG. 15) is 10. Each of the power consumptions for transmitting/receiving the input data passing through the sensor node 101-A (respectively indicated by "B to E:" in FIG. 15) is 10. Therefore, the power consumption of the sensor node 101 is 60. The balloons of the other sensor nodes 101 will not be described in detail.

First, as described above, the node selecting unit 706 selects any one sensor node 101 among the multiple sensor nodes 101 based on the derived power consumption. For example, the node selecting unit 706 selects a first sensor node 101 having the largest power consumption among the multiple sensor nodes 101 based on the derived power consumption. In the example depicted in FIG. 15, the sensor node 101-A is selected as the first sensor node 101. The power consumption of the sensor nodes 101 is equalized in this case by migrating a data process having the request recipient defined as the first sensor node 101 to another one of the sensor nodes 101.

The second node selecting unit 901 selects a second sensor node 101 having a power consumption that is smaller than the first sensor node 101 among the sensor nodes 101. In particular, for example, the second node selecting unit 901 selects as the second sensor node 101, the sensor node 101 having the smallest power consumption among the sensor nodes 101. In the example depicted in FIG. 15, the sensor node 101-G is selected as the second sensor node 101.

The first identifying unit 902 and the second identifying unit 903 identify among the multiple paths, a path that includes the selected second sensor node. The determining unit 904 determines if the largest power consumption of a sensor node 101 on the identified path is a threshold value or greater. This threshold value is a value based on the electrical power amount that can be stored in the battery 509 included in the sensor node 101, for example. If the largest power consumption of the sensor node 101 on the identified path is the threshold value or greater, the second node selecting unit 901 newly selects a sensor node 101 exclusive of an already selected sensor node 101, based on the derived power consumption.

The first identifying unit 902 identifies a first path r21 that is a path included in a path among the multiple paths and that is from the first aggregation apparatus 201-1 to the second sensor node 101. If multiple paths from the first aggregation apparatus 201-1 to the second sensor node 101 exist as paths included in a path among the multiple paths, the first identifying unit 902 identifies the path in which the largest power consumption of a sensor node 101 on the path is smallest, as the first path r21.

The second identifying unit 903 identifies a second path r21 that is a path included in a path among the multiple paths and that is from the second sensor node 101 to the second aggregation apparatus 201-2. If multiple paths from the second sensor node 101 to the second aggregation apparatus 201-2 exist as paths included in a path among the multiple paths, the second identifying unit 903 identifies the path in which the largest power consumption of a sensor node 101 on the path is smallest, as the second path r22.

The determining unit 904 determines if the largest power consumption of a sensor node 101 on the identified first path r21 is a threshold value or greater and if the largest power consumption of a sensor node 101 on the identified second path r22 is equal to or greater than a threshold value. These two threshold values are values based on the electrical power amount that can be stored in the battery 509 included in the sensor node 101, for example. If the largest power consumption of the sensor node 101 on either the first path r21 or the second path r22 is the threshold value or greater, the second node selecting unit 901 newly selects a second sensor node 101 excluding an already selected node, based on the derived power consumption. In particular, the second node selecting unit 901 newly selects as the second sensor node 101, the sensor node 101 having the smallest power consumption among the sensor nodes excluding already selected sensor nodes 101 among the multiple sensor nodes 101, based on the derived power consumption.

In the example depicted in FIG. 15, it is assumed that the second path r22 does not exist and that the largest power consumption of a sensor node 101 on the first path r21 does not exceed the threshold. If none of the sensor nodes 101 on either the first path r21 or the second path r22 has a power consumption exceeding the threshold value, the information processing apparatus 100 can migrate the request recipient of the data process that the sensor node 101-A is requested to execute, to the sensor node 101-G. Therefore, the information processing apparatus 100 then determines how much of the data process amount can be migrated among the data process that the sensor node 101-A is requested to execute.

By migrating the request recipient of the data process that the sensor node 101-A is requested to execute to the sensor node 101-G, an input/output data amount increases at the sensor node 101-G due to the increased data process. As a result, the power consumption for receiving/transmitting the input/output data associated with the sensor node 101-G is increased at the sensor node 101 on the path including the sensor node 101-G. In this example, for simplicity of calculation, the additional input/output data are caused to pass through the identified first and second paths r21, r22. Therefore, since the input data of the sensor node 101-G increases, the power consumption corresponding to the transmission/reception of the input data accordingly increases at the sensor nodes 101 on the first path r21. Similarly, since the output data of the sensor node 101-G increases, the power consumption corresponding to the transmission/reception of the output data accordingly increases at the sensor nodes 101 on the second path r22.

Therefore, if the power consumption is equalized by migrating the data process from the sensor node 101-A to the sensor node 101-G, the information processing apparatus 100 prevents the power consumption of the sensor node 101-G from exceeding a threshold value. This threshold value is a value based on the electrical power amount that can be stored in the battery 509 included in the sensor node 101, for example. The information processing apparatus 100 also prevents the power consumptions of the sensor nodes 101 on the first and second paths r21, r22 increased by the increased input/output data from exceeding a threshold value. This threshold value is a value based on the electrical power amount that can be stored in the battery 509 included in the sensor node 101, for example. The information processing apparatus 100 determines a data process amount for which the power consumption of the sensor node 101 on the first path r21 or the second path r22 does not exceed the power consumption of the sensor node 101-A after the data process amount is changed. Since the power consumption is increased by the same amount at the sensor nodes 101 on the paths, the power consumption may be prevented from exceeding the threshold value at the sensor node 101 having the largest power consumption on each of the first and second paths r21, r22.

Therefore, the first candidate determining unit 905 determines in the data process that the first sensor node 101 is requested to execute, a first candidate for the data process whose request recipient is to be changed to the second sensor node 101. For example, the first candidate determining unit 905 determines the first candidate based on the difference of the power consumption of the first sensor node 101 and the largest power consumption of a sensor node 101 on the first path r21.

For example, the first candidate determining unit 905 calculates, from the decrease in the power consumption of the sensor node 101-A associated with the migration of the data process, an iteration count making the power consumptions of the sensor node 101-A and the sensor node 101-F equal. In particular, for example, the first candidate determining unit 905 calculates "(the power consumption of the first sensor node 101−the largest power consumption of a sensor node 101 on the first path r21)/2". For example, the first candidate determining unit 905 then calculates an input data amount corresponding to the calculated electrical power amount. For example, the first candidate determining unit 905 calculates a first iteration count (i1) corresponding to the calculated input data amount.

The second candidate determining unit 906 determines in the data processes that the first sensor node 101 is requested to execute, a second candidate for the data process having the request recipient changed to the second sensor node 101. For example, the second candidate determining unit 906 determines the second candidate based on the difference of the power consumption of the first sensor node 101 and the largest power consumption of a sensor node 101 on the second path r22. In particular, for example, the second candidate determining unit 906 calculates "(the power consumption of the first sensor node 101–the largest power consumption of a sensor node 101 on the second path r22)/2". For example, the second candidate determining unit 906 then calculates an output data amount corresponding to the calculated electrical power amount. For example, the second candidate determining unit 906 calculates a second iteration count (i2) corresponding to the calculated output data amount. In the example depicted in FIG. 15, the sensor node 101 having the largest power consumption on the first path r21 is the sensor node 101-F. Since the sensor node 101-G directly communicates with the second aggregation apparatus 201-2, none of the other sensor nodes 101 is affected by an increase in the output data of the sensor node 101-G.

The third candidate determining unit 907 determines a third candidate for the data process whose request recipient is to be changed to the second sensor node 101 among the data processes that the first sensor node 101 is requested to execute. For example, the third candidate determining unit 907 determines the third candidate based on the difference of the power consumption of the first sensor node 101 and the power consumption of the second sensor node 101. For example, the third candidate determining unit 907 calculates an iteration count making the power consumptions of the sensor node 101-A and the sensor node 101-G equal when the data process is migrated from the sensor node 101-A to the sensor node 101-G. In particular, for example, the third candidate determining unit 907 calculates "(the power consumption of the first sensor node 101–the largest power consumption of the sensor node 101 on the second path r22)/2". For example, the third candidate determining unit 907 calculates a data process amount corresponding to the calculated electrical power amount. For example, the third candidate determining unit 907 calculates a third iteration count (i3) corresponding to the calculated data process amount.

The generating unit 908 generates information indicating that the request recipient of the data process corresponding to the candidate with the smallest process amount among the first, second, and third candidates is set to the second sensor node 101. For example, the generating unit 908 compares the first iteration count (i1), the second iteration count (i2), and the third iteration count (i3) to select the smallest iteration count. The generating unit 908 generates information indicating that the request recipient of the data process corresponding to the smallest iteration count is set to the second sensor node 101. The generating unit 908 also generates information indicating that the input/output data for the data process corresponding to the smallest iteration count pass through the other sensor nodes 101 on the first and second paths r21 and r22.

For example, the generating unit 908 changes the request recipient of a portion of the data process that the first sensor node 101 is requested to execute indicted by the propagation information 1100, to the second sensor node 101. The generating unit 908 changes the propagation paths indicated by the read propagation information 1100 so that the request information and the process result for the portion of the data process that the first sensor node 101 is requested to execute, propagate through the identified path. In this way, the generating unit 908 generates the new propagation information 1100.

Figure 16:
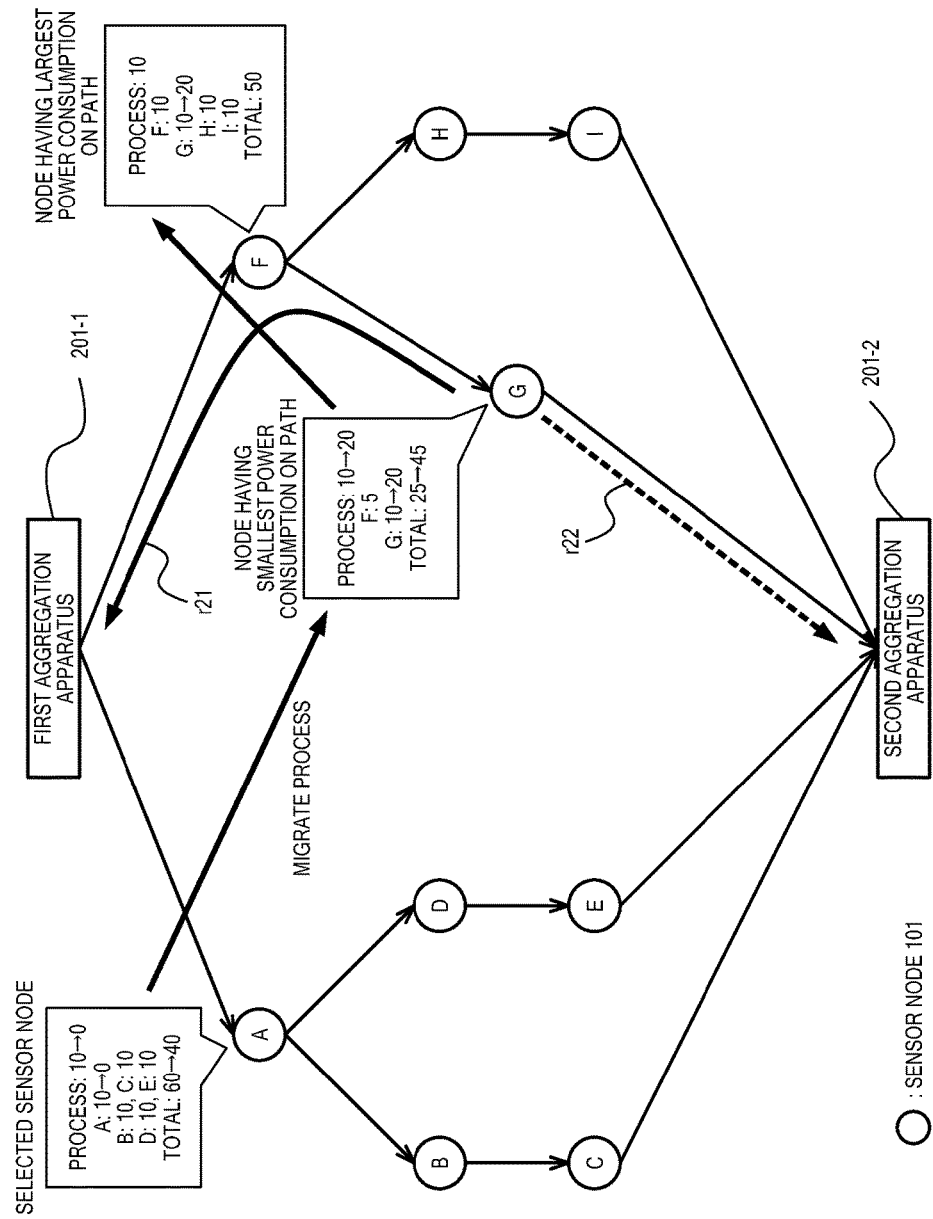
FIG. 16 is an explanatory diagram of the example of a process amount change (part two)

FIG. 16 is an explanatory diagram of the example of a process amount change (part two). In the example depicted in FIG. 16, the data process that the sensor node 101-A is requested to execute is entirely migrated to the sensor node 101-G. Therefore, the data process having the request recipient set to the sensor node 101-G is changed from "10" to "20", and the input data of the sensor node 101-G is changed from "10" to "20" at the sensor node 101-F.

If multiple network NET configurations exist, the information processing apparatus 100 executes an initial arrangement process, a power consumption estimating process, and an averaging process for each of the network NET configurations. The information processing apparatus 100 may request the looped process to the sensor network 200 by utilizing the network NET configuration in which the larger power consumption of the sensor nodes 101 is smallest.

Figure 17:
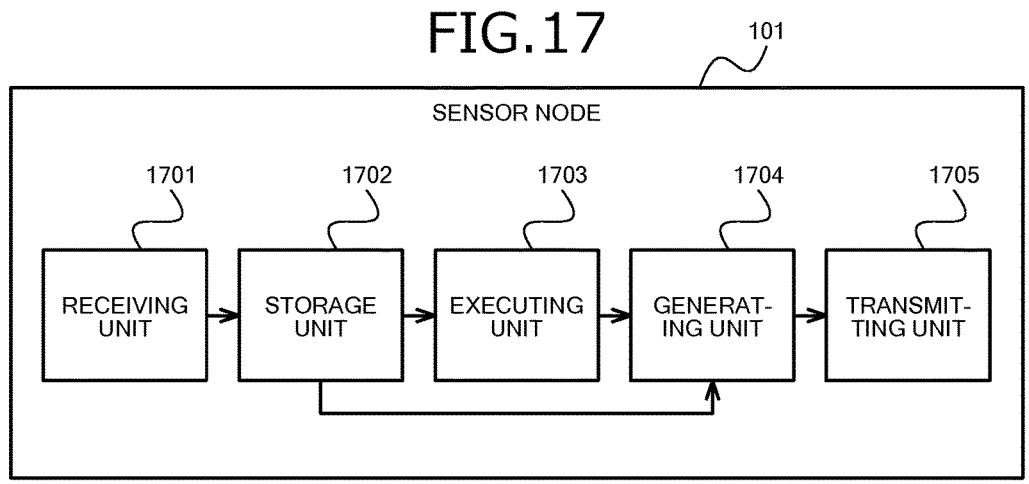
FIG. 17 is a block diagram of a functional configuration of the sensor node.

FIG. 17 is a block diagram of a functional configuration of the sensor node. The sensor node 101 includes a receiving unit 1701, a storage unit 1702, an executing unit 1703, a generating unit 1704, and a transmitting unit 1705. The receiving unit 1701 and the transmitting unit 1705 are realized by the wireless communications circuit 503 and the antenna 507, for example. The storage unit 1702 is realized by the RAM 504 and the non-volatile memory 506, for example.

The processes of the executing unit 1703 and the generating unit 1704 are encoded in a communication program stored in a storage device such as the ROM 505 and the non-volatile memory 506 that can be accessed by the MCU 501, for example. The MCU 501 reads the communication program from the storage device and executes the processes encoded in the communication program. As a result, the processes of the executing unit 1703 and the generating unit 1704 are realized. The output data of the executing unit 1703 and the generating unit 1704 are stored in a storage device such as the RAM 504 and the non-volatile memory 506.

The receiving unit 1701 receives and writes passing information including input or output data into the storage unit 1702. If the input data is included in the passing information read from the storage unit 1702, the executing unit 1703 determines whether the request recipient indicated by the input data included in the read passing information is the sensor node 101 thereof. It is assumed that the read passing information is first passing information. If the request recipient indicated by the input data included in the first passing information is the sensor node 101 thereof, the executing unit 1703 executes the data process based on the input data.

If the request recipient of the input data included in the first passing information is the sensor node 101 thereof, the generating unit 1704 generates second passing information including output data from the executing unit 1703. If the first passing information includes input data having the request recipient that is not the sensor node 101 thereof, the generating unit 1704 generates the second passing information including the input data having the request recipient that is not the sensor node 101 thereof. If the first passing information includes output data, the generating unit 1704 generates the second passing information including the output data.

If the first passing information includes division information, the generating unit 1704 determines whether the sensor node 101 performs division based on the division information. The division information indicates a rate of division of the input or output data by sensor nodes 101 on the path dividing and propagating the input or output data through multiple propagation destinations. The division information also has information indicating which input data or which output data is divided.

If it is determined that the division is to be performed, the generating unit 1704 divides the input or output data based on the division rate indicated by the division information. If it is determined that the division is not to be performed even if the division information is included in the first passing information, the division information is transfer data and therefore, the generating unit 1704 generates the second passing information to include the division information.

The transmitting unit 1705 transmits the passing information generated by the generating unit 1704 to the propagation destination of the sensor node 101 thereof.

Figure 18:
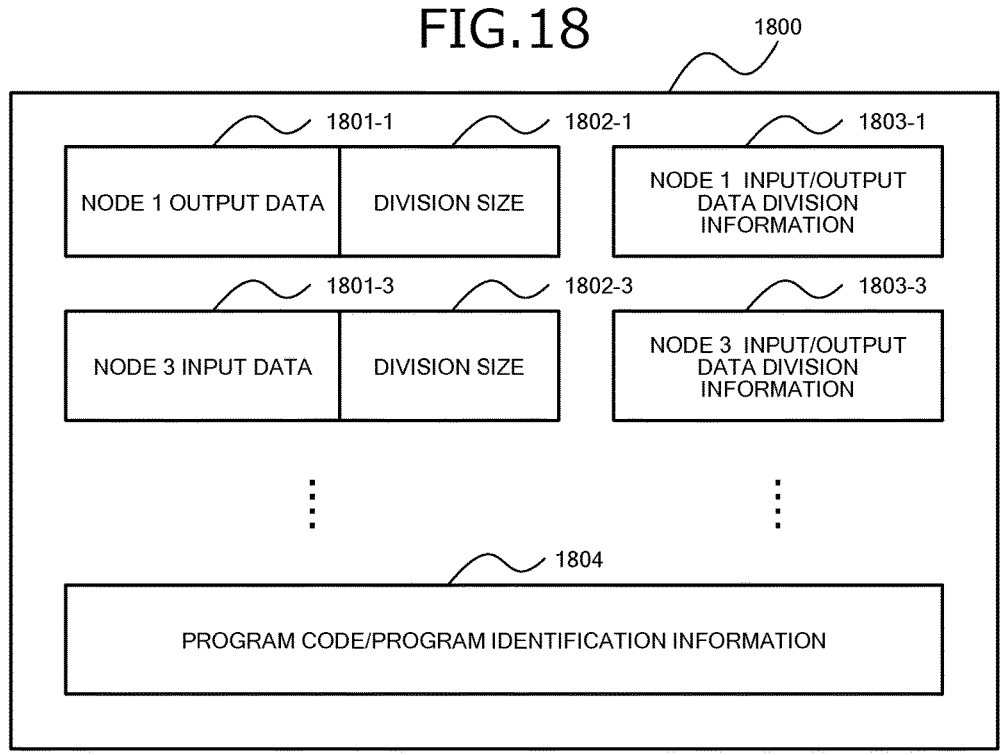
FIG. 18 is an explanatory diagram of an example of passing information.

FIG. 18 is an explanatory diagram of an example of passing information. The passing information has input/output data 1801, a division size 1802, division information 1803, and program code or program identification information 1804. The division size 1802 is the size of the input/output data. The division information 1803 includes information indicating the rate at which the input or output data is to be divided and propagated to each of the child nodes in the sensor node 101 acting as a branching point.

For example, FIG. 18 depicts the passing information 1800 generated for transmission by the sensor node 101-1 to the sensor node 10-3 that is the propagation destination. For example, the division information 1803 may include information indicating a propagation destination based on the propagation path regardless of whether a child node exists. This enables each of the sensor nodes 101 to determine which sensor node 101 is the propagation destination.

Figure 19:
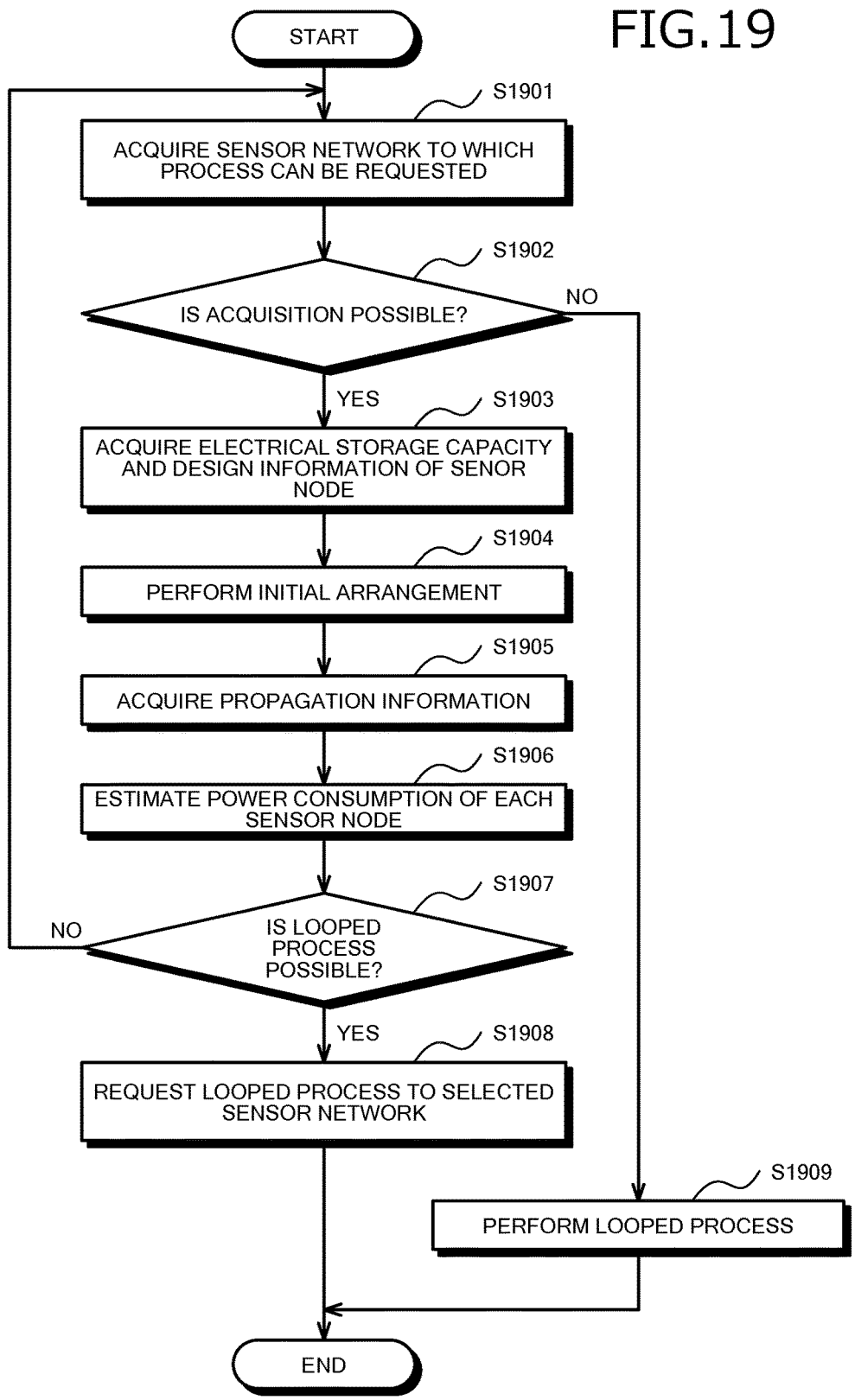
FIG. 19 is a flowchart of an example of an overall process procedure performed by the information processing apparatus.

FIG. 19 is a flowchart of an example of an overall process procedure performed by the information processing apparatus. The information processing apparatus 100 acquires a sensor network 200 to which a process can be requested (step S1901) and determines whether acquisition is possible (step S1902). For example, multiple sensor networks 200 may be present. The information processing apparatus 100 searches for a sensor network 200 that is not performing a sensing operation so as to cause the sensor network 200 to execute a process. The operation of the sensor network 200 is assumed to be of two types, i.e., operation in which sensing is periodically performed to send sensing data to the server 301 and the operation in which detection information is transmitted to the server 301 when some kind of abnormality is detected.

Particularly, if sensing is periodically performed to send sensing data to the server 301, the information processing apparatus 100 can acquire from the server 301, the interval of sensing and the elapsed time since the last sensing. Therefore, this operation is suitable for requesting a looped process. For example, at the determination of whether acquisition is possible at step S1902, it is determined based on the interval of sensing and the elapsed time since the last sensing whether a data process can be requested. Additionally, for example, at the determination of whether acquisition is possible at step S1902, it may be determined whether the sensor network 200 can be sufficiently charged before the next sensing even if the stored electrical power of the battery 509 is exhausted by the requested looped process.

If acquisition is possible (step S1902: YES), the information processing apparatus 100 acquires the electrical storage capacity and the design information of the sensor node 101 (step S1903) and performs the initial arrangement (step S1904). The information processing apparatus 100 acquires the propagation information 1100 acquired from the initial arrangement and stores the information into the storage unit 1702 (step S1905). As a result, at step S1904, the information processing apparatus 100 can perform the initial arrangement to acquire the propagation path.

The information processing apparatus 100 estimates the power consumption of each of the sensor nodes 101 (step S1906) and determines whether the looped process is possible (step S1907). A detailed method of determining whether the looped process is possible will be described with reference to FIG. 20. If the looped process is not possible (step S1907: NO), the information processing apparatus 100 returns to step S1901. On the other hand, if the looped process is possible (step S1907: YES), the information processing apparatus 100 requests the looped process to the selected sensor network 200 (step S1908) and terminates a series of the operations. If the acquisition is not possible (step S1902: NO), the information processing apparatus 100 performs the looped process by itself (step S1909) and terminates a series of the operations.

Figure 20:
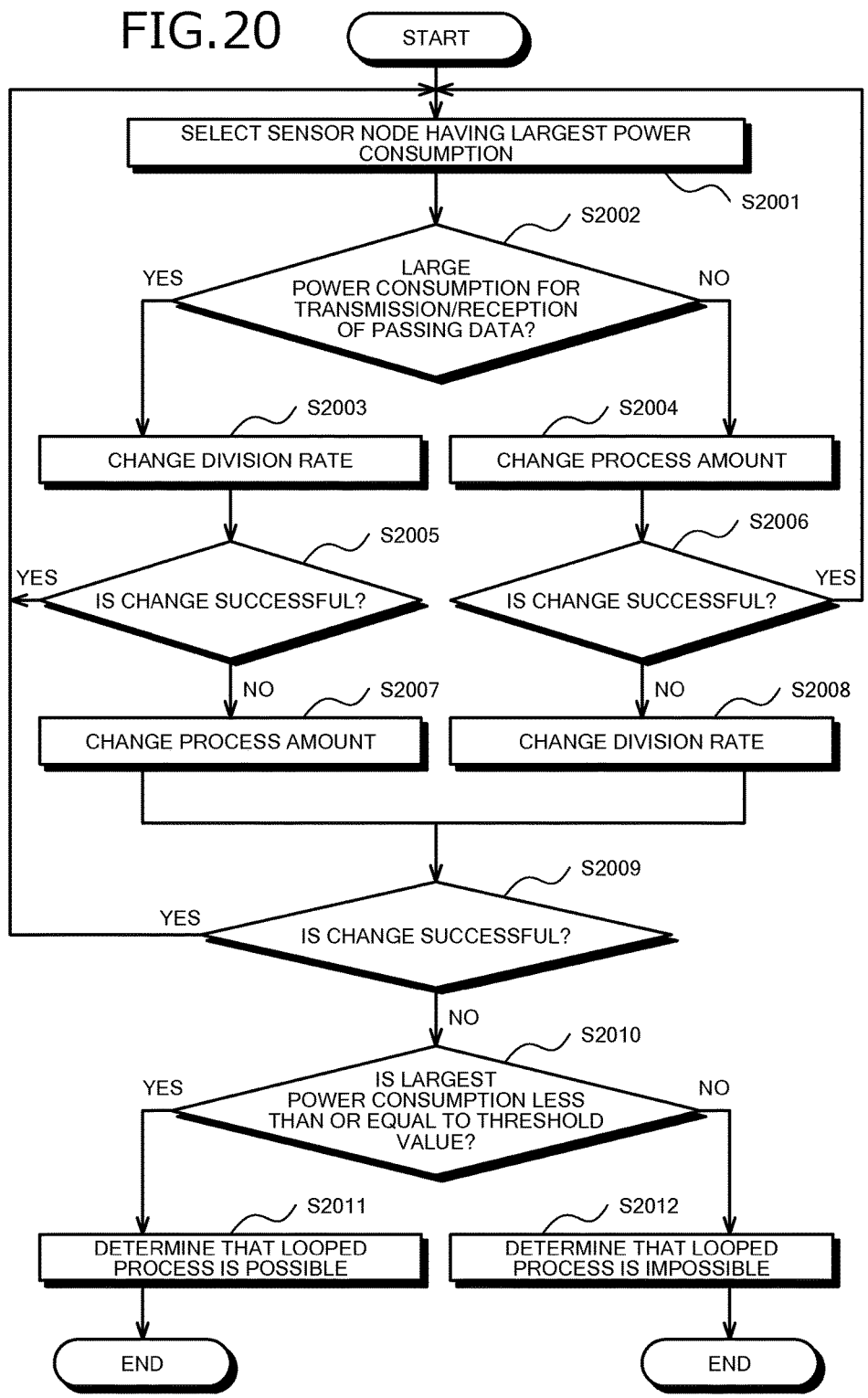
FIG. 20 is a flowchart of an example of an equalization process procedure performed by the information processing apparatus.

FIG. 20 is a flowchart of an example of an equalization process procedure performed by the information processing apparatus. The information processing apparatus 100 selects the sensor node 101 having the largest power consumption among non-selected sensor nodes (step S2001). The information processing apparatus 100 determines whether the power consumed by the selected sensor node 101 for transmission/reception of passing data is larger than the power consumption required for the requested data process (step S2002).

If the power consumed by the selected sensor node 101 for transmission/reception of passing data is larger than the power consumption required for the requested data process (step S2002: YES), the information processing apparatus 100 executes the process of changing the division rate (step S2003) and determines whether the change is successful (step S2005). If the change is successful (step S2005: YES), the information processing apparatus 100 returns to step S2001.

If the power consumed by the selected sensor node 101 for transmission/reception of passing data is equal to or less than the power consumption required for the requested data process (step S2002: NO), the information processing apparatus 100 executes the process of changing the process amount (step S2004) and determines whether the change is successful (step S2006). If the change is successful (step S2006: YES), the information processing apparatus 100 returns to step S2001.

If the change is not successful (step S2005: NO), the information processing apparatus 100 executes the process of changing the process amount (step S2007) and transitions to step S2009. If the change is not successful (step S2006: NO), the information processing apparatus 100 executes the process of changing the division rate (step S2008) and transitions to step S2009.

Subsequent to step S2007 or step S2008, the information processing apparatus 100 determines whether the change is successful (step S2009). If the change is successful (step S2009: YES), the information processing apparatus 100 returns to step S2001. If the change is not successful (step S2009: NO), the information processing apparatus 100 determines of the largest power consumption is a threshold value or less (step S2010). This threshold value is a value based on the electrical power amount that can be stored in the battery 509 included in the sensor node 101, for example.

If the largest power consumption is the threshold value or less (step S2010: YES), the information processing apparatus 100 determines that the looped process is possible (step S2011) and terminates a series of the operations. For example, at step S2011, the information processing apparatus 100 may generate and output information indicating that the looped process is possible. If the largest power consumption is not equal to or less than the threshold value (step S2010: NO), the information processing apparatus 100 determines that the looped process is impossible (step S2012) and terminates a series of the operations. For example, at step S2012, the information processing apparatus 100 may generate and output information indicating that the looped process is not possible.

The process of changing the division rate and the determination of success of the change will be described in detail with reference to FIGS. 21 and 22 and the process of changing the process amount and the determination of success of the change will be described in detail with reference to FIGS. 23 to 25.

Figure 21:
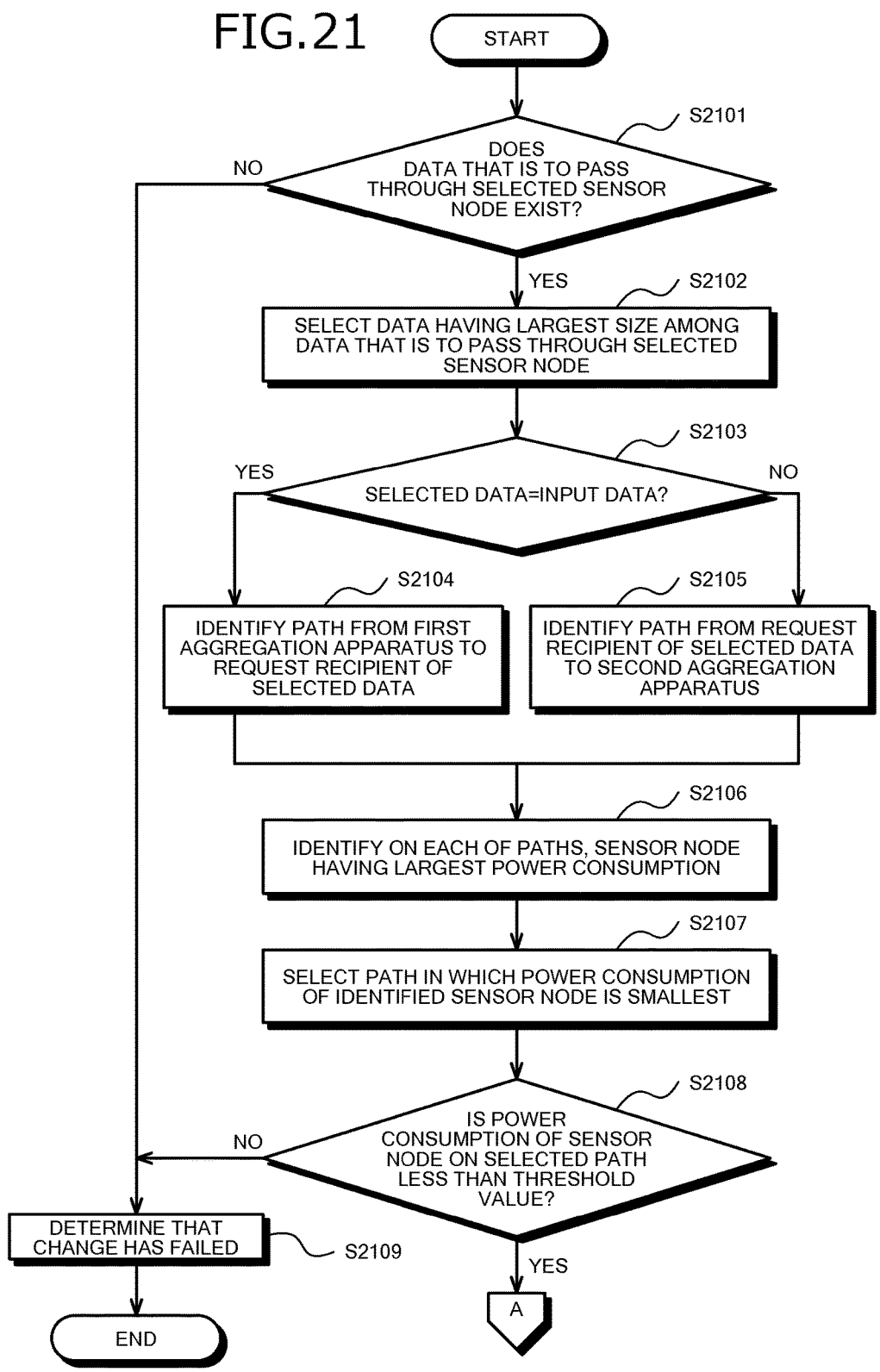
FIG. 21 is a flowchart of an example of a division rate change process procedure performed by the information processing apparatus (part one)
Figure 22:
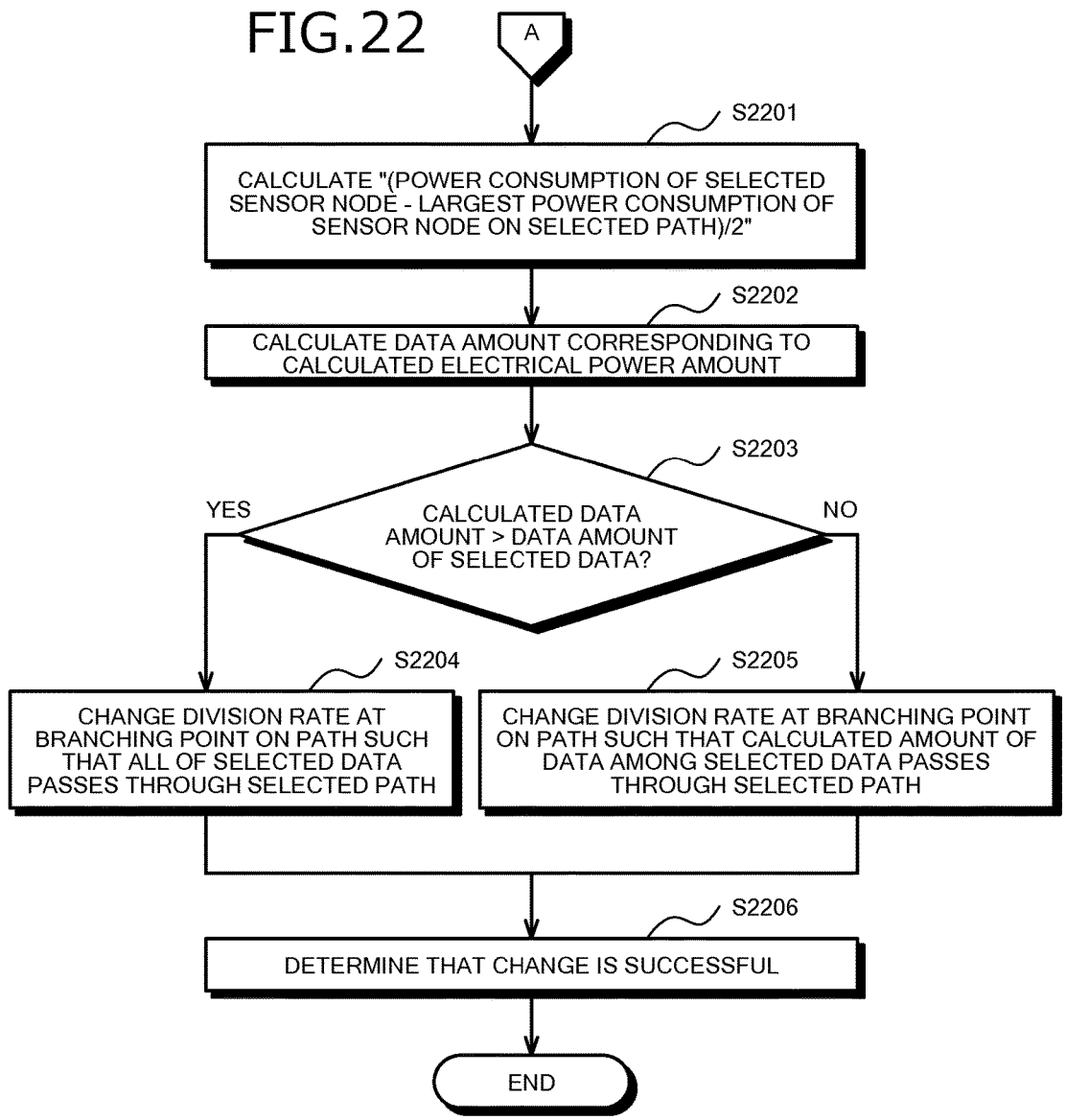
FIG. 22 is a flowchart of the example of the division rate change process procedure performed by the information processing apparatus (part two)

FIGS. 21 and 22 are flowcharts of an example of a division rate change process procedure performed by the information processing apparatus. The information processing apparatus 100 determines whether data that is to pass through the selected sensor node 101 exists based on the propagation information 1100 generated based on the initial arrangement (step S2101). If data that is to pass through the selected sensor node 101 does not exist (step S2101: NO), the information processing apparatus 100 determines that the change has failed (step S2109) and terminates a series of the operations. For example, at step S2109, the information processing apparatus 100 may generate and output information indicating that the change has failed.

If data that is to pass through the selected sensor node 101 exists (step S2101: YES), the information processing apparatus 100 selects data having the largest size among the data that is to pass through the selected sensor node 101 (step S2102). The information processing apparatus 100 determines whether the selected data is input data (step S2103). If the data is input data (step S2103: YES), the information processing apparatus 100 identifies a path from the first aggregation apparatus 201-1 to the request recipient of the selected data (step S2104) and transitions to step S2106. If the data is not input data (step S2103: NO), the information processing apparatus 100 identifies a path from the request recipient of the selected data to the second aggregation apparatus 201-2 (step S2105) and transitions to step S2106.

Subsequent to step S2104 or step S2105, the information processing apparatus 100 identifies on each of the paths, the sensor node 101 having the largest power consumption (step S2106) and selects the path in which the power consumption of the identified sensor node 101 is smallest (step S2107). Steps S2106 and S2107 are executed when multiple paths are identified. The information processing apparatus 100 determines whether the power consumption of the sensor node 101 on the selected path is less than a threshold value (step S2108). This threshold value is a value based on the electrical power amount that can be stored in the battery 509 included in the sensor node 101, for example. If the power consumption of the sensor node 101 on the selected path is not less than the threshold value (step S2108: NO), the information processing apparatus 100 transitions to step S2109.

If the power consumption of the sensor node 101 on the selected path is less than the threshold value (step S2108: YES), the information processing apparatus 100 calculates "(the power consumption of the selected sensor node 101− the largest power consumption of a sensor node 101 on the selected path)/2" (step S2201). The information processing apparatus 100 calculates the data amount corresponding to the calculated electrical power amount (step S2202) and determines whether the calculated data amount>the data amount of the selected data is satisfied (step S2203).

If the calculated data amount>the data amount of the selected data is satisfied (step S2203: YES), the information processing apparatus 100 changes the division rate at the branching point on the path such that the all of selected data passes through the selected path (step S2204), and transitions to step S2206. If the calculated data amount>the data amount of the selected data is not satisfied (step S2203: NO), the information processing apparatus 100 changes the division rate at the branching point on the path such that the calculated data amount of data among the selected data passes through the selected path (step S2205), and transitions to step S2206. Subsequent to step S2204 or step S2205, the information processing apparatus 100 determines that the change is successful (step S2206) and terminates a series of the operations. For example, at step S2206, the information processing apparatus 100 may generate and output information indicating that the change is successful.

Figure 23:
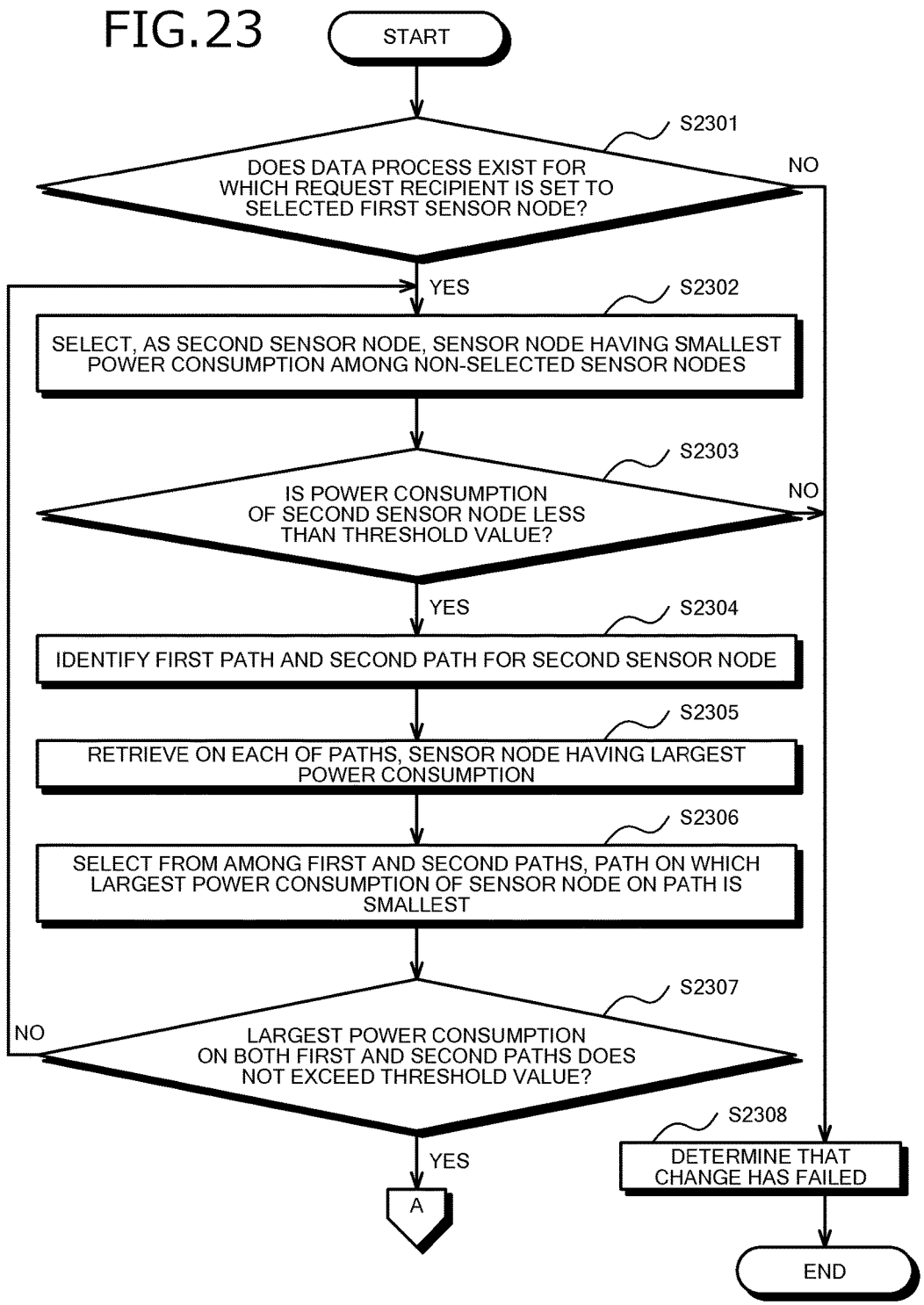
FIG. 23 is a flowchart of an example of a process amount change process procedure performed by the information processing apparatus.
Figure 24:
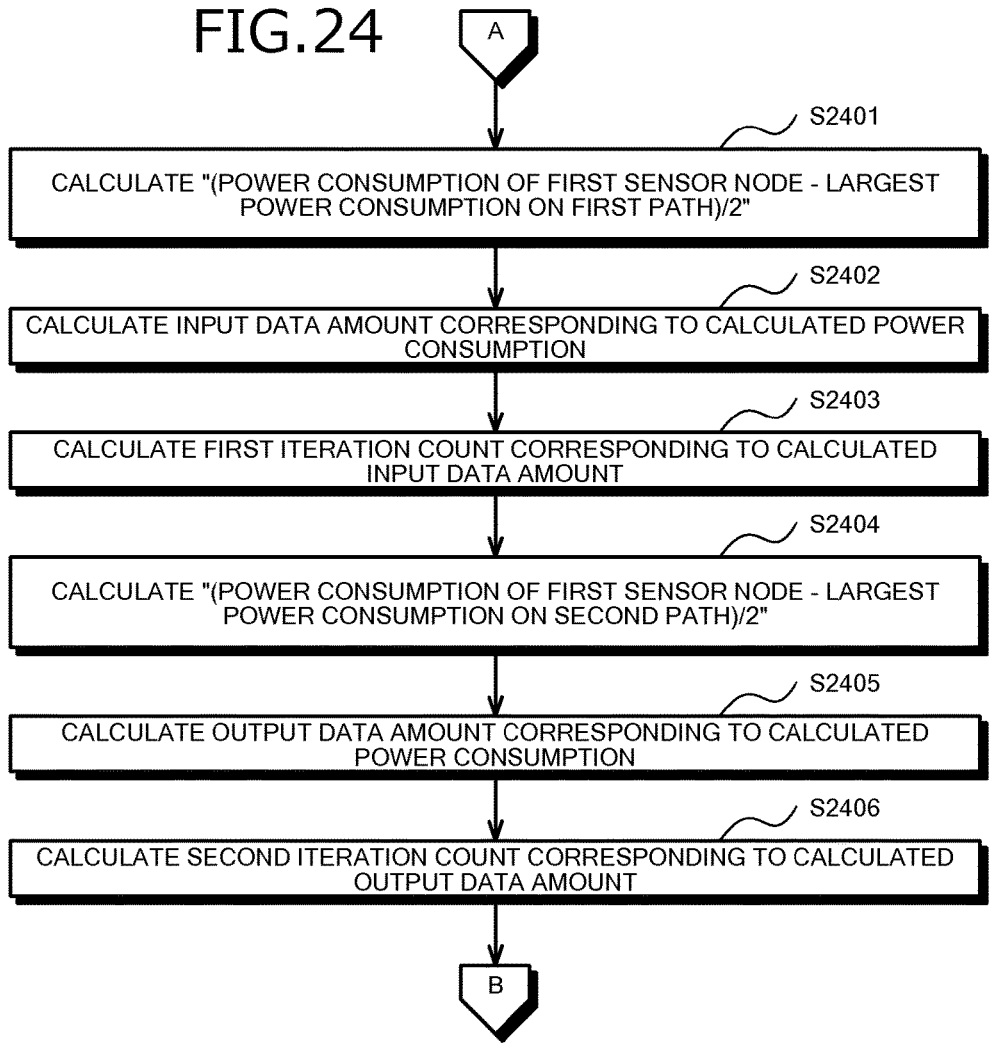
FIG. 24 is a flowchart of the example of a process amount change process procedure performed by the information processing apparatus.
Figure 25:
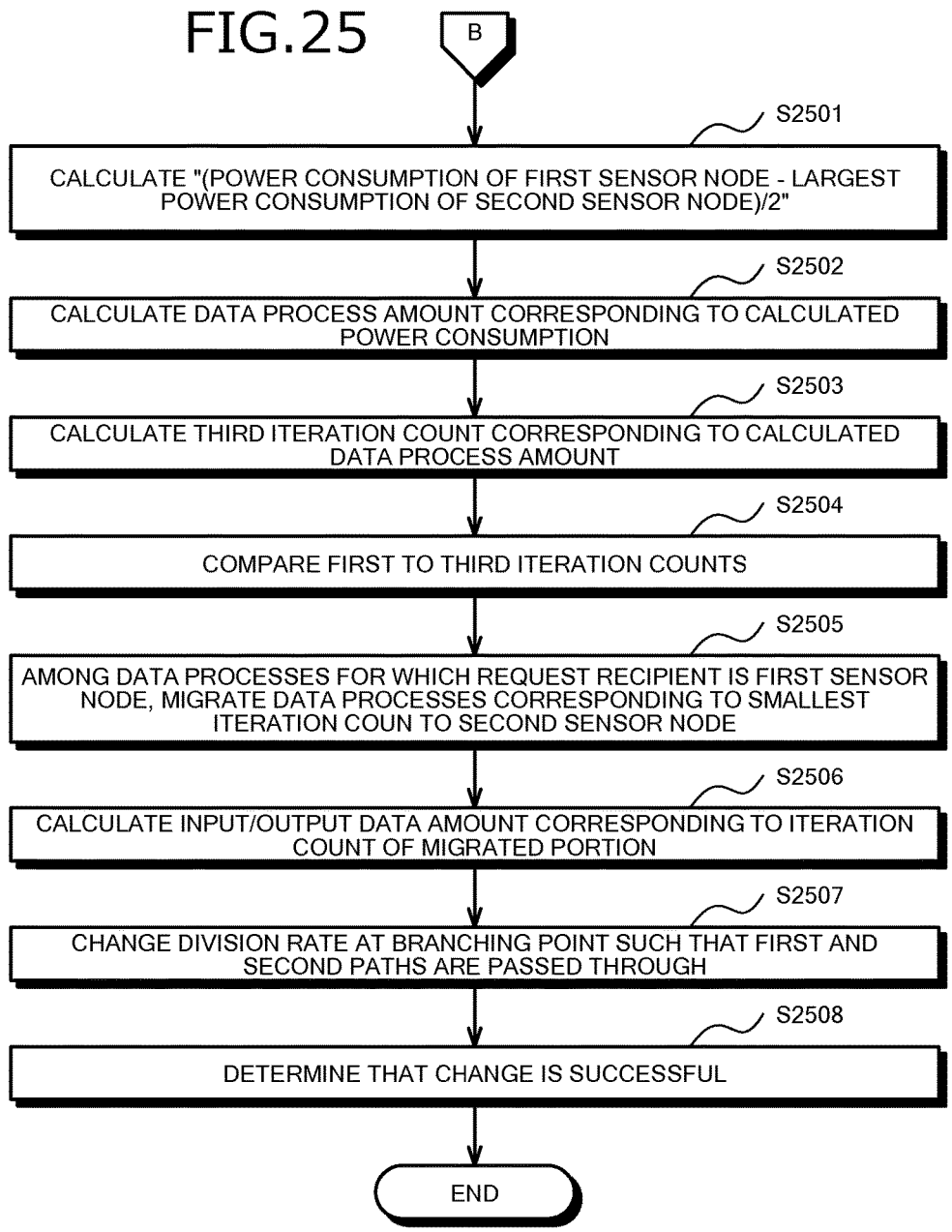
FIG. 25 is a flowchart of the example of a process amount change process procedure performed by the information processing apparatus.

FIGS. 23, 24, and 25 are flowcharts of an example of a process amount change process procedure performed by the information processing apparatus. The information processing apparatus 100 determines whether a data process exists for which the request recipient is set to the selected first sensor node 101 (step S2301). This first sensor node 101 is the sensor node 101 selected at step S2001 in FIG. 20.

If no data process exists for which the request recipient is set to the selected first sensor node 101 (step S2301: NO), the information processing apparatus 100 determines that the change has failed (step S2308) and terminates a series of the operations. For example, at step S2308, the information processing apparatus 100 may generate and output information indicating that the change has failed. If a data process exists for which the request recipient is set to the selected first sensor node 101 (step S2301: YES), the information processing apparatus 100 selects, as the second sensor node 101, the sensor node 101 having the smallest power consumption among the non-selected sensor nodes 101 (step S2302).

The information processing apparatus 100 determines whether the power consumption of the second sensor node 101 is less than a threshold value (step S2303). This threshold value is a value based on the electrical power amount that can be stored in the battery 509 included in the sensor node 101, for example. If the power consumption of the second sensor node 101 is not less than the threshold value (step S2303: NO), the information processing apparatus 100 transitions to step S2308. If the power consumption of the second sensor node 101 is less than the threshold value (step S2303: YES), the information processing apparatus 100 identifies the first path and the second path for the second sensor node 101 (step S2304). The first path is a path from the first aggregation apparatus 201-1 to the second sensor node 101 and the second path is a path from the second sensor node 101 to the second aggregation apparatus 201-2.

The information processing apparatus 100 retrieves on each of the paths, the sensor node 101 having the largest power consumption (step S2305) and selects from among the first and second paths, the path on which the largest power consumption of the sensor node 101 on the path is smallest (step S2306). The information processing apparatus 100 determines whether the largest power consumption on both the first and second paths does not exceed a threshold value (step S2307). This threshold value is a value based on the electrical power amount that can be stored in the battery 509 included in the sensor node 101, for example. If exceeded (step S2307: NO), the information processing apparatus 100 returns to step S2302.

If not exceeded (step S2307: YES), the information processing apparatus 100 calculates "(the power consumption of the first sensor node 101–the largest power consumption on the first path)/2" (step S2401). The information processing apparatus 100 calculates the input data amount corresponding to the calculated power consumption (step S2402) and calculates the first iteration count i1 corresponding to the calculated input data amount (step S2403).

The information processing apparatus 100 calculates "(the power consumption of the first sensor node 101–the largest power consumption on the second path)/2" (step S2404). The information processing apparatus 100 calculates the output data amount corresponding to the calculated power consumption (step S2405). The information processing apparatus 100 calculates the second iteration count i2 corresponding to the calculated output data amount (step S2406) and transitions to step S2501.

The information processing apparatus 100 calculates "(the power consumption of the first sensor node 101–the largest power consumption of the second sensor node 101)/2" (step S2501) and calculates the data process amount corresponding to the calculated power consumption (step S2502). The information processing apparatus 100 calculates the third iteration count i3 corresponding to the calculated data process amount (step S2503) and compares the first to third iteration counts i1 to i3 (step S2504). The information processing apparatus 100 migrates in the data process having the request recipient set to the first sensor node 101, a data process corresponding to the smallest iteration count to the second sensor node 101 (step S2505) and calculates the input/output data amount corresponding to the iteration count of the migrated portion (step S2506). The migration at step S2505 means changing the request recipient.

The information processing apparatus 100 changes the division rate at the branching point such that the first and second paths are passed through (step S2507), determines that the change is successful (step S2508), and terminates a series of the operations. For example, at step S2508, the information processing apparatus 100 may generate and output information indicating that the change is successful. The order of execution is not particularly limited among the operations at steps S2401 to S2403, the operations at steps S2404 to S2406, and the operations at steps S2501 to S2503.

Figure 26:
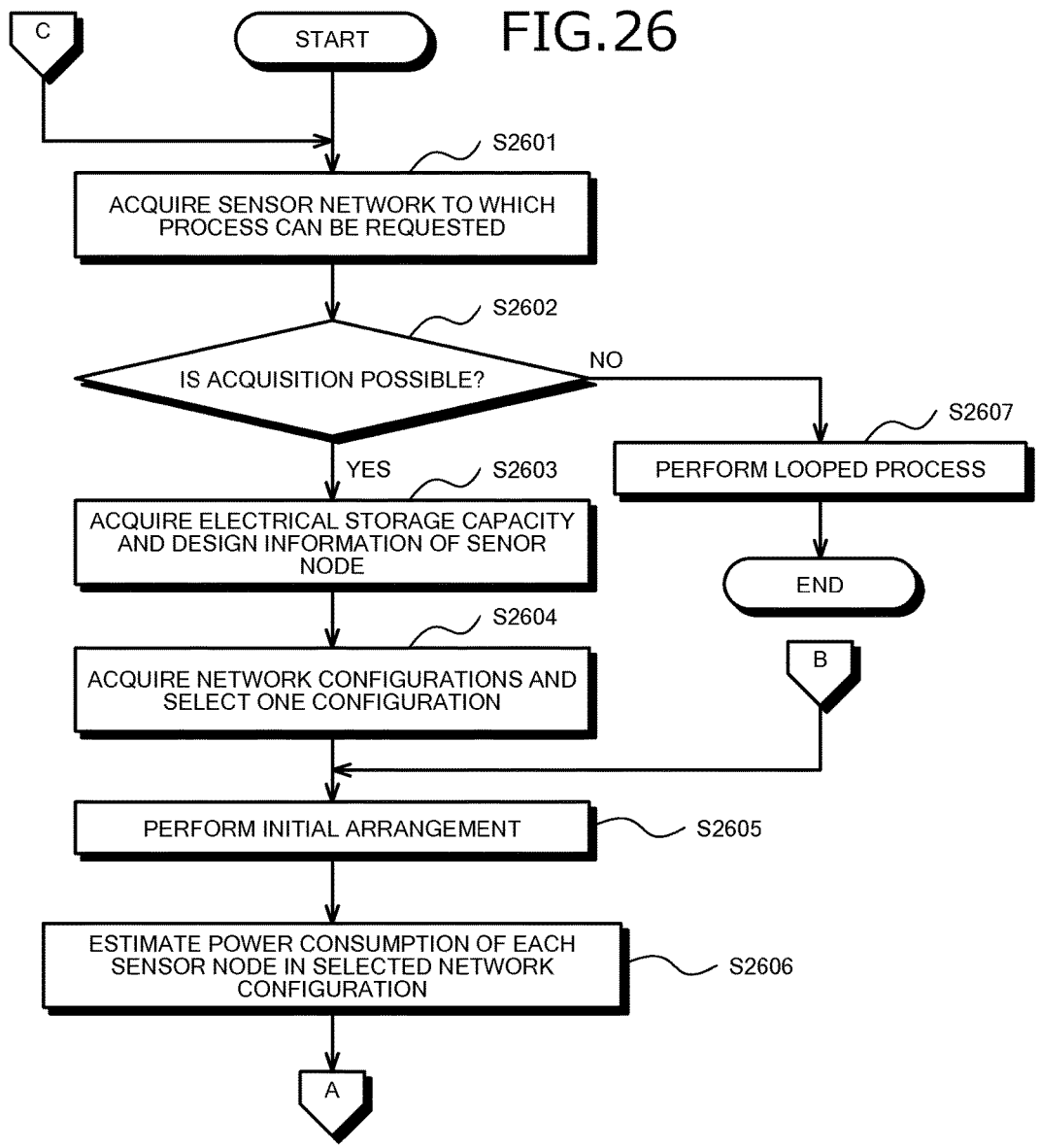
FIG. 26 is a flowchart of an example of a process procedure performed by the information processing apparatus when multiple network configurations exist.
Figure 27:
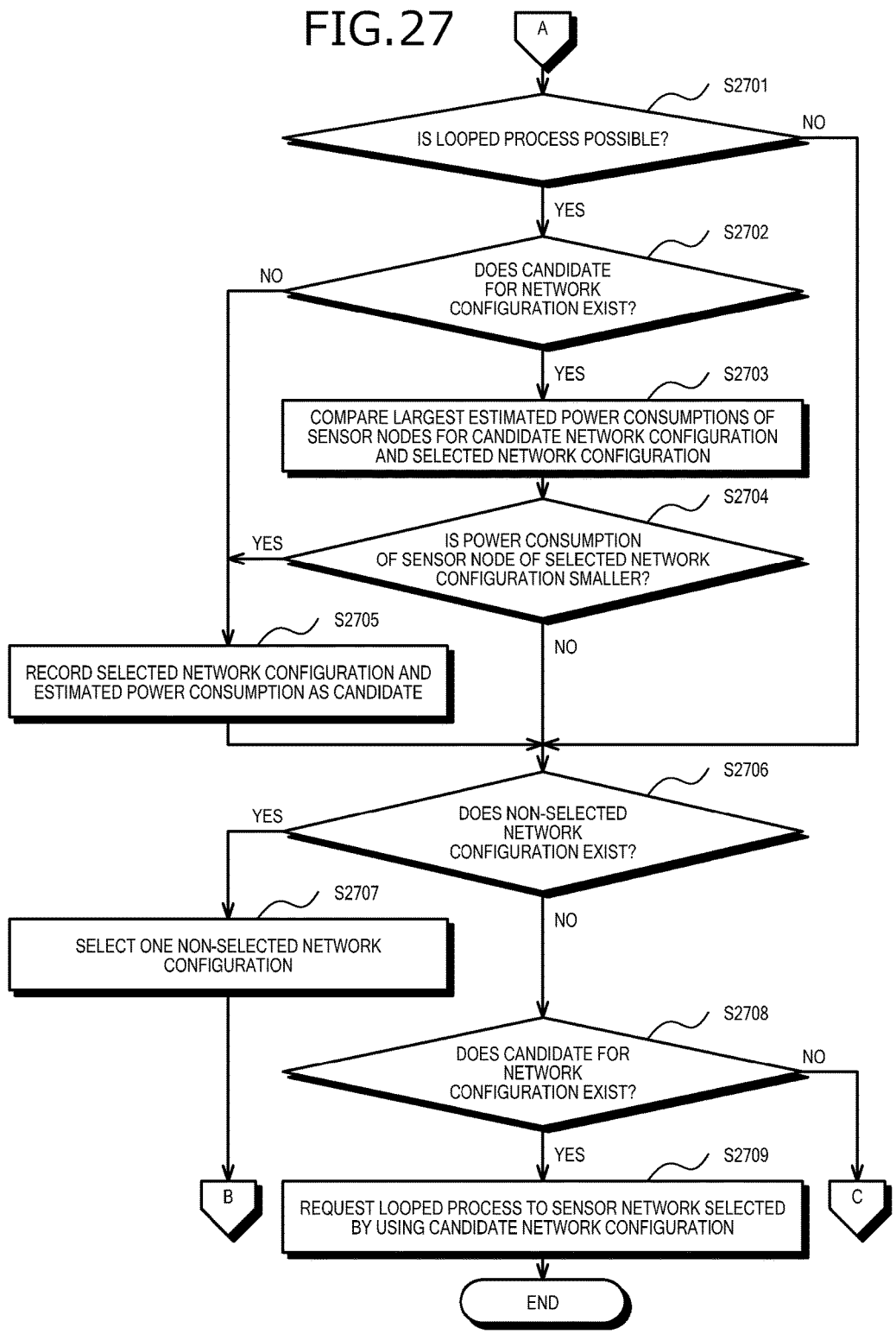
FIG. 27 is a flowchart of the example of the process procedure performed by the information processing apparatus when multiple network configurations exist.

FIGS. 26 and 27 are flowcharts of an example of a process procedure performed by the information processing apparatus when multiple network configurations exist. The information processing apparatus 100 acquires the sensor network 200 to which a process can be requested (step S2601) and determines whether acquisition is possible (step S2602). For example, multiple sensor networks 200 may exist. A network configuration is acquired from, for example, another apparatus such as the server 301, with respect to a sensor network 200 for which the determination is not made as to whether the looped process can be requested. If acquisition is not possible (step S2602: NO), the information processing apparatus 100 performs the looped process (step S2607) and terminates a series of the operations.

If acquisition is possible (step S2602: YES), the information processing apparatus 100 acquires the electrical storage capacity and the design information of the sensor node 101 (step S2603), and the information processing apparatus 100 acquires the network configurations to select one configuration (step S2604) and performs the initial arrangement (step S2605). As a result, at step S2605, the information processing apparatus 100 can perform the initial arrangement to acquire a propagation path. The information processing apparatus 100 estimates the power consumption of each of the sensor nodes 101 in the selected network configuration (step S2606) and transitions to step S2701.

The information processing apparatus 100 determines whether the looped process is possible (step S2701). A detailed method of determining whether the looped process is possible is depicted in FIG. 20 described above. If the looped process is not possible (step S2701: NO), the information processing apparatus 100 transitions to step S2706. If the looped process is possible (step S2701: YES), the information processing apparatus 100 determines whether a candidate for the network configuration exists (step S2702).

If a candidate for the network configuration does not exist (step S2702: NO), the information processing apparatus 100 records the selected network configuration and the estimated power consumption as a candidate (step S2705) and transitions to step S2706. If a candidate for the network configuration exists (step S2702: YES), the information processing apparatus 100 compares the largest estimated power consumptions of the sensor nodes 101 between the candidate for the network configuration and the selected network configuration (step S2703).

The information processing apparatus 100 determines whether the power consumption of the sensor node 101 of the selected network configuration is smaller (step S2704). If the power consumption of the sensor node 101 of the selected network configuration is smaller (step S2704: YES), the information processing apparatus 100 transitions to step S2705. If the power consumption of the sensor node 101 of the selected network configuration is not smaller (step S2704: NO), the information processing apparatus 100 transitions to step S2706.

The information processing apparatus 100 determines whether a non-selected network configuration exists (step S2706). If a non-selected network configuration exists (step S2706: YES), the information processing apparatus 100 selects one non-selected network configuration (step S2707) and returns to step S2605.

If a non-selected network configuration does not exist (step S2706: NO), the information processing apparatus 100 determines whether a candidate for the network configuration exists (step S2708). If a candidate for the network configuration exists (step S2708: YES), the information processing apparatus 100 requests the looped process to the sensor network 200 selected by using the candidate for the network configuration (step S2709) and terminates a series of the operations. If a candidate for the network configuration does not exist (step S2708: NO), the information processing apparatus 100 returns to step S2601.

Figure 28:
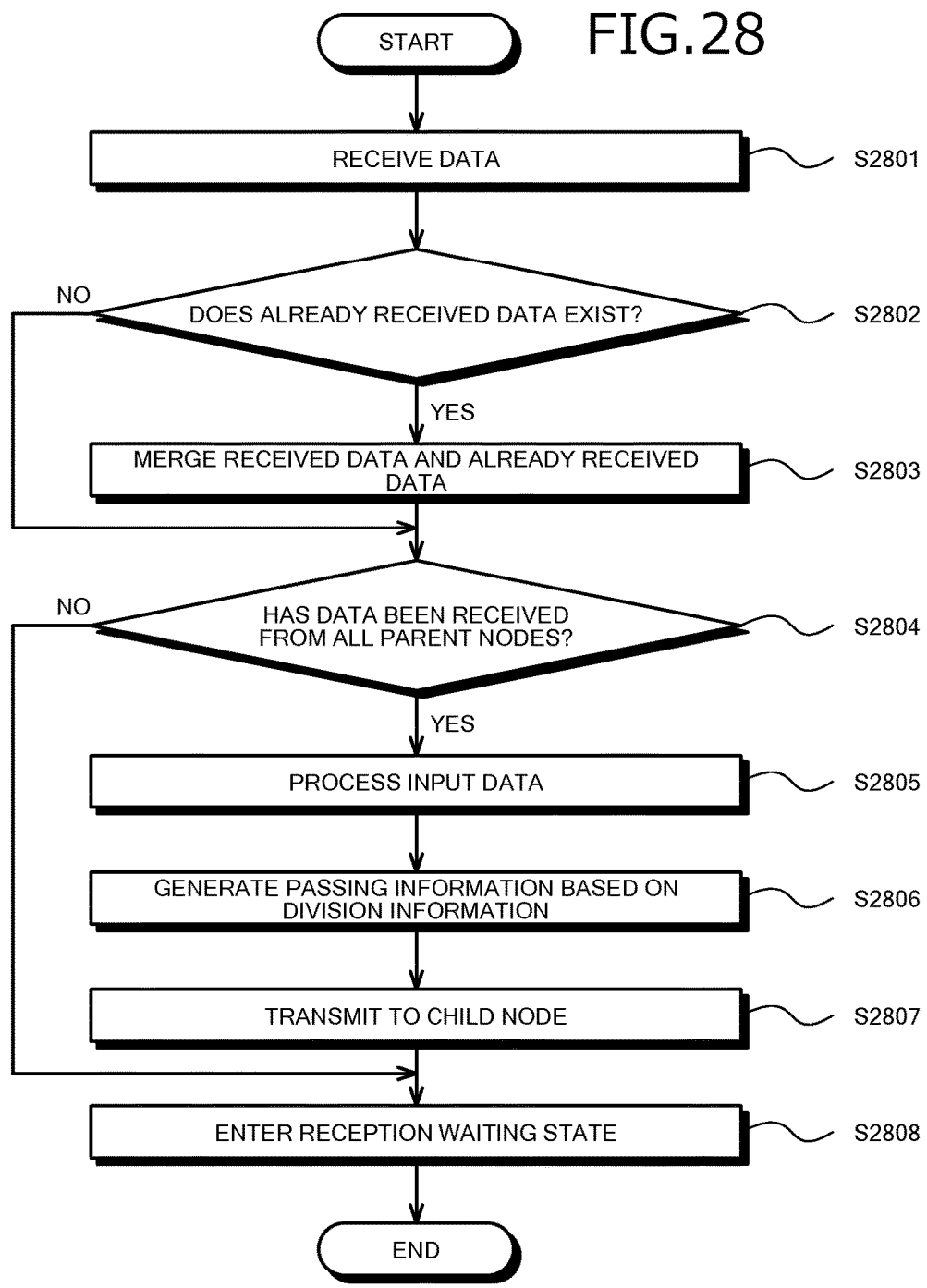
FIG. 28 is a flowchart of an example of a process procedure performed by the sensor node.

FIG. 28 is a flowchart of an example of a process procedure performed by the sensor node. When receiving data (step S2801), the sensor node 101 determines whether already received data exists (step S2802). It is noted that both the received data and the already received data are the passing information 1800 having deferent contents. If already received data exists (step S2802: YES), the sensor node 101 merges the received data and the already received data (step S2803). For example, since the input or output data may be transmitted in a divided manner to the sensor node 101 having multiple parent nodes, the data are merged at step S2803.

If already received data does not exist (step S2802: NO), or subsequent to step S2803, the sensor node 101 determines whether data has been received from all the parent nodes (step S2804). For example, if the sensor node 101 has information indicating the propagation path in advance, the sensor node 101 may make the determination at step S2804 based on the information indicating the propagation path. Alternatively, for example, the sensor node 101 may make the determination at step S2804 based on whether the predetermined time has elapsed since the reception time of the last received data.

If data has been received from all the parent nodes (step S2804: YES), the sensor node 101 executes a data process based on the input data having the request recipient set to the sensor node 101 (step S2805) and generates the passing information based on the division information included in the received data (step S2806). If no input data has the request recipient set to the sensor node 101, step S2805 is not executed. The sensor node 101 transmits the generated passing information to a child node that is a propagation destination (step S2807), enters a reception waiting state (step S2808), and terminates a series of the operations.

If data has not been received from all the parent nodes (step S2804: NO), the sensor node 101 transitions to step S2808. This enables the sensor node 101 to wait until all of the passing information has been received.

Figure 29:
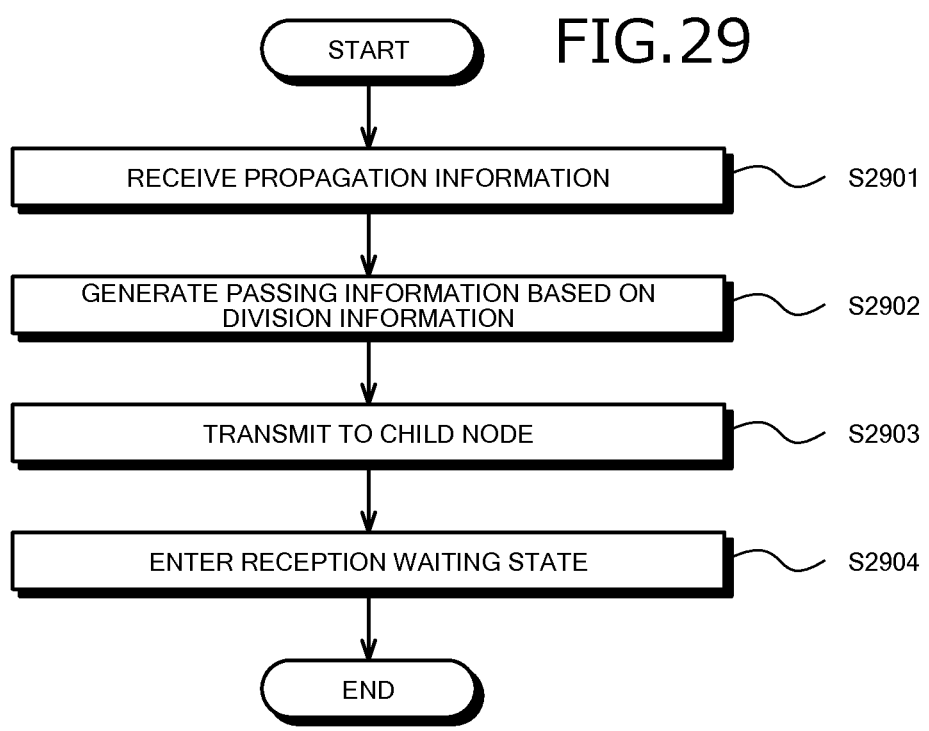
FIG. 29 is a flowchart of an example of a process procedure performed by the first aggregation apparatus.

FIG. 29 is a flowchart of an example of a process procedure performed by the first aggregation apparatus. The first aggregation apparatus 201-1 receives the propagation information 1100 from the information processing apparatus 100 (step S2901) and generates passing information for each child node based on the division information included in the propagation information 1100 (step S2902). The first aggregation apparatus 201-1 transmits the generated passing information to the child nodes (step S2903) and enters the reception waiting state (step S2904).

FIG. 30 is a flowchart of an example of a process procedure performed by the second aggregation apparatus. The second aggregation apparatus 201-2 receives data (step S3001) and determines whether already received data exists (step S3002). It is noted that both the received data and the already received data are the passing information 1800 having deferent contents. If it is determined that already received data exists (step S3002: YES), the second aggregation apparatus 201-2 merges the received data and the already received data (step S3003). For example, the second aggregation apparatus 201-2 may sort the output data by iteration before merging.

If it is determined that already received data does not exist (step S3002: NO), or subsequent to step S3003, the second aggregation apparatus 201-2 determines whether data has been received from all the parent nodes (step S3004). If it is determined that data has been received from all the parent nodes (step S3004: YES), the second aggregation apparatus 201-2 transmits the merged data to the server 301 or the information processing apparatus 100 (step S3005).

If it is determined that data has not been received from all the parent nodes (step S3004: NO), or subsequent to step S3005, the second aggregation apparatus 201-2 enters the reception waiting state (step S3006) and terminates a series of the operations.

As described above, the information processing apparatus selects a sensor node based on the power consumption estimated from a tentatively determined propagation path and generates information indicating that the transfer path for a portion of the data to be transferred by the sensor node is changed to a path bypassing the sensor node. As a result, the information processing apparatus can achieve a reduction in electrical power amount required for the transfer by the selected sensor node. Therefore, the information processing apparatus can achieve equalization of power consumption among the sensor nodes.

For example, the information processing apparatus generates propagation information indicating a new propagation path based on acquired propagation information and information indicating transfer by a sensor node on an identified path. As a result, the information processing apparatus can achieve a reduction in electrical power amount required for the transfer by the selected sensor node. Therefore, the information processing apparatus can achieve equalization of power consumption among the sensor nodes.

If the largest derived power consumption of a sensor node on the identified path is equal to or greater than a threshold value, the information processing apparatus generates information indicating propagation through a propagation path indicated by the acquired propagation information. As a result, the information processing apparatus can prevent failure of making a request for a data process to a sensor network due to a migration, if the power consumption is large at the migration destination of the transfer of the request information or process result.

The information processing apparatus selects the sensor node having the largest power consumption, thereby achieving a reduction in electrical power amount required for the transfer by the selected sensor node having a large power consumption. Therefore, the information processing apparatus can achieve equalization of power consumption among the sensor nodes.

The information processing apparatus selects the request information or process result having the largest size. As a result, the information processing apparatus sets the request information or process result having the power consumption required for transfer larger than the others as a candidate for migration to another path, thereby achieving an increased data amount that can be migrated by one migration process. Therefore, the information processing apparatus can achieve a reduction in the time required to equalize power consumption.

If multiple paths are identified, the information processing apparatus selects the path in which the largest derived power consumption of a sensor node on the identified path is smallest among the identified paths, and enables the selected request information or process result to propagate through the selected path. As a result the information processing apparatus can achieve equalization of power consumption among the sensor nodes.

The information processing apparatus determines the information to be propagated through the identified path from among the selected request information or process result based on the difference of the power consumption of the selected sensor node and the largest power consumption of the sensor node on the identified path. As a result, the information processing apparatus can prevent the power consumption of the sensor nodes on the identified path from exceeding the power consumption of the selected sensor node after a portion of the request information or process result is migrated to the identified path. Therefore, the information processing apparatus achieves equalization of power consumption between the selected sensor node and the sensor nodes on the identified path.

If the power consumption required for transfer of the selected sensor node is larger than the power consumption required for the data process requested to the selected sensor node, the information processing apparatus changes the path of a portion of the transferred request information or process result. As a result, the information processing apparatus achieves a reduction in power consumption of the selected sensor node by utilizing a method estimated as being capable of reducing the power consumption to a greater extent.

If the power consumption required for transfer by the selected sensor node is smaller than the power consumption required for the data process requested to the selected sensor node, the information processing apparatus changes the request recipient of the data process requested to the selected sensor node. As a result, the information processing apparatus can achieve a reduction in power consumption of the selected sensor node by utilizing a method estimated as being capable of reducing the power consumption to a greater extent.

The information processing apparatus changes the request recipient of the data process requested to the selected first sensor node, to the selected second sensor node having a power consumption that is lower than the first sensor node. As a result, the information processing apparatus can achieve a reduction in the power consumption required for the data process of the first sensor node.

The information processing apparatus can select the second sensor node having the lowest power consumption, thereby achieving an increased data process amount that can be migrated by one migration process. As a result, the information processing apparatus can achieve a reduction in the time required for the equalization of power consumption.

If the largest power consumption on the path including the second sensor node is a threshold value or greater, the information processing apparatus selects a new second sensor node. The information processing apparatus can determine the request recipient of the data process such that the power consumption of each of the sensor nodes in the sensor network does not exceed the threshold value even after the request recipient of the data process is changed. As a result, the information processing apparatus can achieve equalization of the power consumption.

The information processing apparatus determines a candidate for a data process amount whose request recipient is to be changed, based on the difference of the power consumption of the first sensor node and the largest power consumption on the path from the first aggregation apparatus to the second sensor node. As a result, the information processing apparatus can achieve equalization of the power consumption of the first sensor node and the power consumption of the sensor nodes on the path from the first aggregation apparatus to the second sensor node. The information processing apparatus determines a candidate for a data process amount whose request recipient is to be changed, based on the difference of the power consumption of the first sensor node and the largest power consumption on the path from the second sensor node to the second aggregation apparatus. As a result, the information processing apparatus can achieve equalization of the power consumption of the first sensor node and the power consumption of the sensor nodes on the path from the second sensor node to the second aggregation apparatus.

The information processing apparatus determines a candidate for a data process amount whose request recipient is to be changed, based on the difference of the power consumption of the first sensor node and the power consumption of the second sensor node. As a result, the information processing apparatus can achieve equalization of the power consumption of the first sensor node and the power consumption of the second sensor node.

When the information processing apparatus derives the power consumption of each of the sensor nodes in the case of propagation through the propagation paths indicated by the propagation information and the largest power consumption is less than the threshold value, the information processing apparatus requests a data process to the sensor network. As a result, since the data process is requested to the sensor network for which the battery is predicted to not run out, the information processing apparatus can improve the reliability by which normal process results of the data process can be acquired.

If the division information is included in the received passing information and multiple propagation destinations exist for the sensor node, the sensor node transmits the request information or process result in a divided manner to the propagation destinations based on the division information. As a result, even data processes having the same request recipient can be provided through different paths.

The information processing method described in the present embodiment may be implemented by executing a prepared program on a computer such as a personal computer and a workstation. The program is stored on a non-transitory, computer-readable recording medium such as a hard disk, a flexible disk, a compact disk (CD)-ROM, and a digital versatile disk (DVD), read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method executed by a computer having a storage device storing therein information, the information processing method comprising:
acquiring and writing path information into the storage device, the path information indicating a plurality of paths enabling propagation of different data from a first aggregation apparatus to a second aggregation apparatus by multi-hop communication among a plurality of communications nodes;
acquiring and writing propagation information into the storage device, the propagation information indicating for data processes that the plurality of communications nodes are requested to execute by the computer, a propagation path among the plurality of paths and a communications node on the propagation path and to which execution of the data processes is requested, the propagation path propagating request information requesting the execution of the data processes and a process result of the data processes;
deriving power consumptions respectively for each communications node among the plurality of communications nodes, based on the path information and the propagation information read from the storage device;
selecting a communications node from the plurality of communications nodes, based on the derived power consumptions;
selecting any one among request information and a process result to be transferred by the selected communications node, based on the propagation information;

if the request information is selected at the selecting, identifying, in a path of the plurality of paths, a path that excludes the selected communications node and is from the first aggregation apparatus to the communications node to which a data process relevant to the request information is requested, and generating information indicating that one portion of the request information selected at the selecting is propagated through a path that includes the selected communications node, while another portion of the request information is propagated through the identified path that excludes the selected communications node; and if the process result is selected at the selecting, identifying, in a path of the plurality of paths, a path that excludes the selected communications node and is from the communications node to which a data process of the process result is requested to the second aggregation apparatus, and generating information indicating that one portion of the process result selected at the selecting is propagated through a path that includes the selected communications node, while another portion of the process result is propagated through the identified path that excludes the selected communications node.

2. The information processing method according to claim 1, wherein the generating of the information indicating propagation through the identified path includes generating propagation information in which the propagation path is changed such that at least a portion of the selected request information or process result is propagated through the respective identified path.

3. The information processing method according to claim 2, further comprising determining if a largest power consumption derived for a communications node on the identified path is a threshold value or greater, wherein the generating of the information indicating propagation through the identified path includes generating propagation information in which the propagation path indicated by the read propagation information is changed such that at least a portion of the selected request information or process result is propagated through the identified path, when the largest power consumption is less than the threshold value, and includes generating information indicating propagation through the propagation path indicted by the read propagation information, when the largest power consumption is equal to or greater than the threshold value.

4. The information processing method according to claim 1, wherein the selecting of a communications node from the plurality of communications nodes includes selecting the communications node that has a largest power consumption among the plurality of communications nodes, based on the derived power consumptions.

5. The information processing method according to claim 1, wherein the selecting of any one among request information and a process result includes selecting from among request information or process results to be transferred by the selected communications node, request information or a process result that has a largest size.

6. The information processing method according to claim 1, further comprising selecting, when multiple paths are identified at the identifying, a path in which a largest derived power consumption of a communications node on the path is smallest among the identified paths, wherein the generating of the information indicating propagation through the identified path includes generating information indicating that at least a portion of the selected request information or process result is propagated through the selected path.

7. The information processing method according to claim 1, further comprising determining among the selected request information or process result, information to be propagated through the identified path, based on a difference of the power consumption of the selected communications node and the largest power consumption of a communications node on the identified path, among the derived power consumptions, wherein the generating of the information indicating propagation through the identified path includes generating information indicating that the determined information is propagated through the identified path.

8. The information processing method according to claim 1, further comprising determining whether among the derived power consumptions for the selected communications node, power consumption required for transfer of the request information or the process result to be transferred by the selected communications node is larger than power consumption required for a data process requested to the selected communications node among the data processes, wherein the selecting of any one among request information and a process result to be transferred by the selected communications node includes when the power consumption required for the transfer is larger than the power consumption required for the data process, selecting from among the request information or the process result and based on the acquired propagation information, request information or a process result to be transferred by the selected communications node.

9. The information processing method according to claim 8, wherein when the power consumption required for the transfer is smaller than the power consumption required for the data process, the information processing method further comprises:

refraining from selecting the request information or the process result, identifying the path exclusive of the selected communications node, and generating the information indicating propagation through the identified path;

selecting a second communications node having a power consumption smaller than the communications node selected from among the plurality of communications nodes and regarded as a first communications node, based on the derived power consumptions;

identifying among the plurality of paths, a path that includes the second communications node; and generating information indicating that among the plurality of data processes, a portion of the data process requested to the selected first communications node is requested to the selected second communications node and indicating that request information and a process result for the portion of the data process requested to the selected first communications node are propagated through the identified path.

* * * * *